US008085667B2

(12) United States Patent
Yamaguchi et al.

(10) Patent No.: US 8,085,667 B2
(45) Date of Patent: Dec. 27, 2011

(54) WIRELESS RELAY APPARATUS AND WIRELESS RELAY METHOD

(75) Inventors: Takao Yamaguchi, Osaka (JP); Atsushi Yoshida, Osaka (JP); Tomoki Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/667,446

(22) PCT Filed: Apr. 8, 2009

(86) PCT No.: PCT/JP2009/001625
§ 371 (c)(1),
(2), (4) Date: Dec. 31, 2009

(87) PCT Pub. No.: WO2009/139111
PCT Pub. Date: Nov. 19, 2009

(65) Prior Publication Data
US 2010/0195561 A1 Aug. 5, 2010

(30) Foreign Application Priority Data
May 15, 2008 (JP) ................................. 2008-128838

(51) Int. Cl.
*H04L 1/00* (2006.01)
(52) U.S. Cl. ............ 370/235; 370/315; 375/260; 455/8
(58) Field of Classification Search .................. None
See application file for complete search history.

(56) References Cited

U.S. PATENT DOCUMENTS 6,441,747 B1 * 8/2002 Khair et al. ............. 340/870.16
7,468,945 B2 * 12/2008 Enomoto et al. .............. 370/231
2002/0167929 A1 * 11/2002 Wakizaka ..................... 370/342
2004/0139897 A1 * 7/2004 Nakaya et al. ..................... 114/1
2004/0242275 A1  12/2004 Corbett et al. ............. 455/562.1

(Continued)

FOREIGN PATENT DOCUMENTS
EP 1 755 238 A1 2/2007
(Continued)

OTHER PUBLICATIONS

Zhang, Bing, "Cross-layer Networking Technology for Wireless Communications", IEICE Technical Report, MoMuC2008-90, AN2008-76, Mar. 2009, pp. 29-34 (with partial English translation).

(Continued)

*Primary Examiner* — Chi H. Pham
*Assistant Examiner* — Shick Hom
(74) *Attorney, Agent, or Firm* — Wenderoth, Lind and Ponack, L.L.P.

(57) ABSTRACT

A wireless relay apparatus capable of high-quality transmission of data includes a wireless control unit and a data link communication unit wirelessly receiving and transmitting data. The wireless relay apparatus also includes a congestion status determining unit determining whether a congestion caused by radio wave interference occurs in the wireless relay apparatus, and includes a data flow determining unit identifying a flow of data transmitted and received by the wireless relay apparatus and determining whether the flows intersect in the wireless relay apparatus, when the congestion status determining unit determines that there is a congestion. In addition, the wireless relay apparatus includes a transmission parameter adjustment unit adjusting transmission characteristics of a type according to a result of the determination by the data flow determining unit, from among types of transmission characteristics of radio used in at least one of the wireless control unit and the communication apparatuses.

15 Claims, 15 Drawing Sheets

U.S. PATENT DOCUMENTS

| | | | |
|---|---|---|---|
| 2005/0053005 A1 | 3/2005 | Cain et al. | 370/235 |
| 2008/0317039 A1* | 12/2008 | Satterlee et al. | 370/395.5 |
| 2009/0323836 A1* | 12/2009 | Nakano et al. | 375/260 |
| 2010/0329134 A1* | 12/2010 | Doppler et al. | 370/252 |

FOREIGN PATENT DOCUMENTS

| | | |
|---|---|---|
| JP | 2001-128231 | 5/2001 |
| JP | 2004-364287 | 12/2004 |
| JP | 2005-328458 | 11/2005 |
| JP | 2007-19574 | 1/2007 |
| JP | 2007-505565 | 3/2007 |
| JP | 2008-5306 | 1/2008 |
| WO | 2005/027262 | 3/2005 |
| WO | 2006/001308 A1 | 1/2006 |

OTHER PUBLICATIONS

Jaturong Sangiamwong et al. "*A Study on Interference-Aware Beamforming Control in CSMA/CA-Based Wireless Mesh Networks*" The Institute of Electronics, Information and Communication Engineers, Technical report of IEICE. RCS, vol. 106, No. 25, RCS2006-11, pp. 61-66, Apr. 2006.

\* cited by examiner

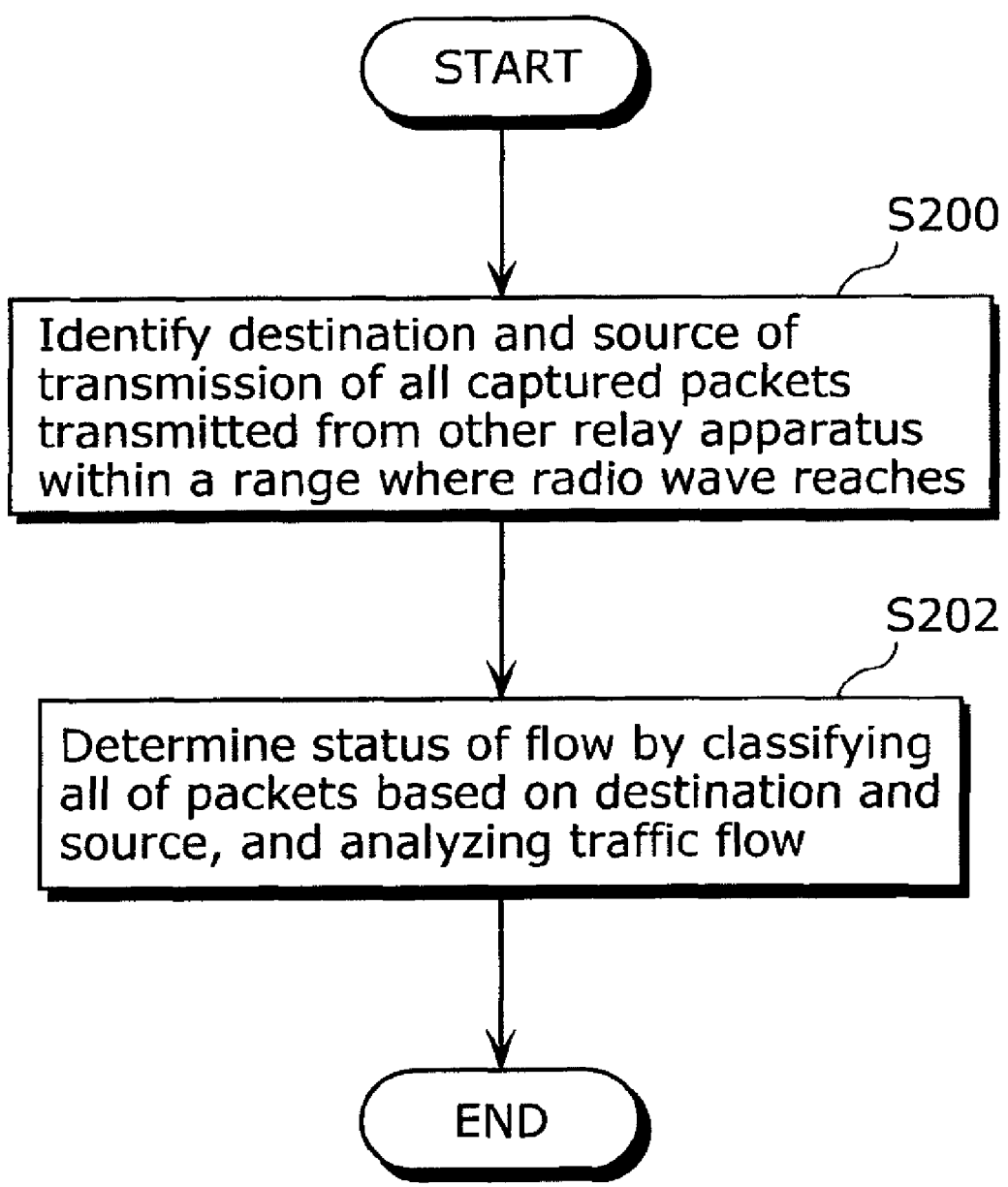

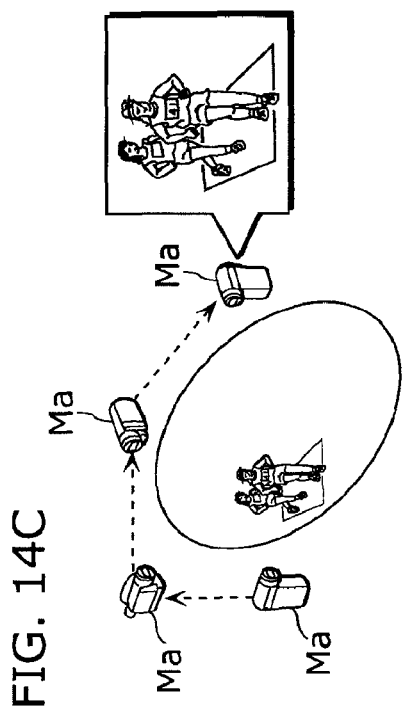
FIG. 14A
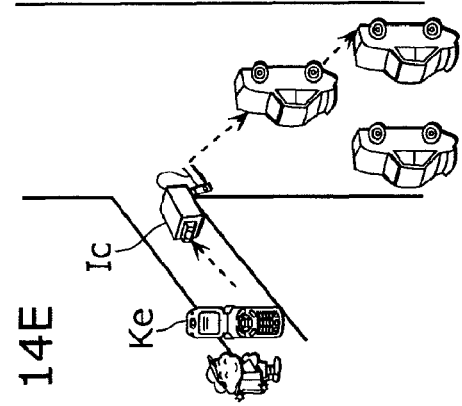
FIG. 14B
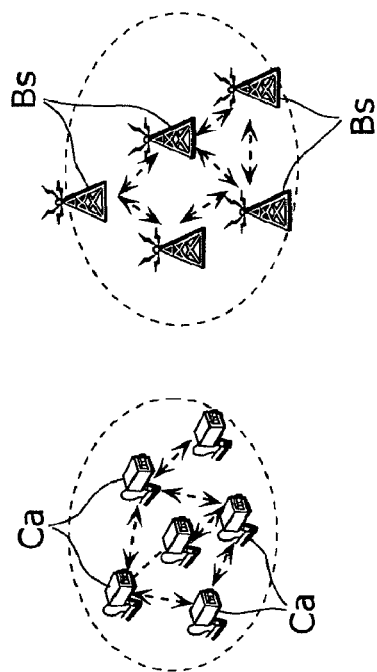
FIG. 14C
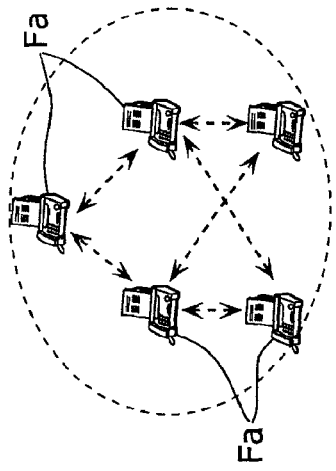
FIG. 14D
FIG. 14E

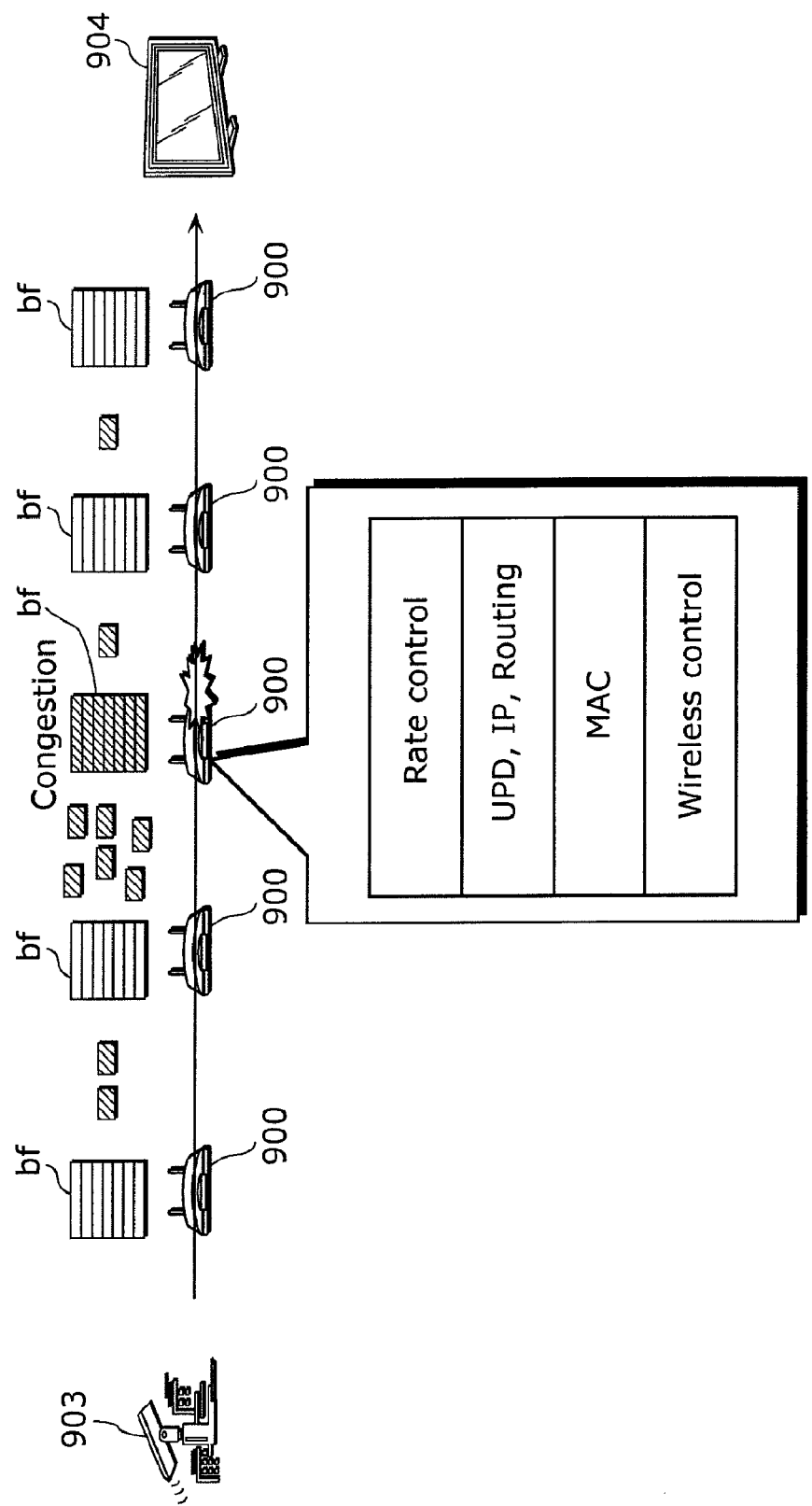

WIRELESS RELAY APPARATUS AND WIRELESS RELAY METHOD

TECHNICAL FIELD

The present invention relates to a wireless relay apparatus included in a network having a wireless network configuration which can be dynamically modified, and to a wireless relay method performed by the wireless relay apparatus.

BACKGROUND ART

In a wireless Local Area Network (LAN) which is configured with only the terminals that does not require an access point and capable of establishing wireless connection, the network configuration can be dynamically modified. Such a network is generally referred to as an ad-hoc network or a mesh network.

Terminals that can establish wireless connection in the network include, for example, personal computers, Persona Digital Assistants (PDA), mobile phones, and terminals for on-vehicle car navigation system.

FIGS. 15A and 15B are diagrams showing examples of networks having a wireless network configuration which can be dynamically modified.

Such a network includes, as shown in FIG. 15A, monitoring cameras 901 each of which includes a wireless relay apparatus, as a specific example. The monitoring cameras 901 are fixed and are not mobile. Another specific example is shown in FIG. 15B. The network therein includes movie cameras 902 (mobile phones with cameras) each of which includes the wireless relay apparatus. The movie camera 902 is carried by the user and is mobile.

The wireless relay apparatus includes a buffer which temporarily accumulates the data received from another wireless relay apparatus which is a transmission source until the data is transferred to another wireless relay apparatus which is a transfer destination. The wireless relay apparatus includes the buffer in order to prevent the variation in the quality of wireless transmission with the other wireless relay apparatus which is the transmission source and with the wireless relay apparatus which is the destination. For example, when the effective bandwidth temporarily decreases due to the degradation in the quality of wireless transmission between the wireless relay apparatus and the other wireless relay apparatus which is the transmission source, the buffer suppresses the influence of the decrease in the effective bandwidth.

However, the buffer overflows when the reduction in the effective bandwidth exceeds the capacity of the buffer. As a result, the packets to be transmitted are disposed, and if the data to be transmitted is video data, the video becomes blurry and the reproduction delays.

In other words, in the ad-hoc network, the wireless relay apparatuses are wirelessly connected. This is likely to cause buffer overflow in the wireless relay apparatuses due to the effect of the variations in the radio band, that is, the communication failure is likely to occur. The communication failure refers to a failure in communication caused by errors in transmission and by congestion. The communication failure assumes, for example, a case where the congestion occurs in the wireless relay apparatus due to the traffic interference as a result of converging traffic and a variation in the physical bandwidth, and a case where the radio wave interference due to the obstacles and movement of the wireless relay apparatus itself cause the errors in transmission.

Accordingly, in the ad-hoc network, various approaches have been proposed as a method to achieve a low-delay, high-quality transmission without packet loss.

FIG. 16 shows the congestion control by the wireless relay apparatuses.

For example, as shown in FIG. 16, the transmission terminal 903 wirelessly transmits the data to the receiving terminal 904 via the wireless relay apparatuses 900. Here, each wireless relay apparatus 900 includes a buffer bf, and transmits and receives the data via the buffer bf. In this case, the wireless relay apparatus 900 appropriately controls the rate at the application level and the timing of transmission in the Media Access Control (MAC) layer, and thereby adjusting the amount of data transmitted from the transmission terminal 903 and other wireless relay apparatuses 900 to prevent the buffer from overflowing, avoiding the congestion. Therefore, it is possible to achieve high-quality transmission.

However, the congestion cannot be solved merely by controlling the amount of transmission, because the congestion also occurs due to the radio wave interference caused by the radio control regarding the antenna such as the radio wave frequency and directivity and the magnitude of the radio wave output from the wireless relay apparatus.

FIGS. 17A and 17B are explanatory diagrams for describing the congestion caused by the radio wave interference.

For example, as shown in FIG. 17A, the congestion occurs due to the radio wave interference between the wireless relay apparatuses 900a to 900d relaying the parallel flows of traffic. For example, when the wireless relay apparatus 900a receives the data and transmits the data to the wireless relay apparatus 900c, the wireless relay apparatus 900a receives, not only the radio wave for the data, but also the radio wave output from the wireless relay apparatus 900b. As a result, the congestion caused by the radio wave interference occurs in the wireless relay apparatus 900a.

Furthermore, for example, as shown in FIG. 17B, the congestion occurs due to the radio wave interference among the wireless relay apparatuses 900a to 900e relaying the intersecting traffic. For example, the wireless relay apparatus 900e receives the data from the wireless relay apparatus 900a and receives data from the wireless relay apparatus 900c as well.

As a result, the congestion caused by the radio wave interference occurs in the wireless relay apparatus 900e. In the cases shown in FIGS. 17A and 17B, the radio wave attenuates when the radio waves in the traffic flows interrupt each other, causing the congestion.

In order to solve this problem, a wireless relay method for avoiding the congestion caused by the radio wave interference has been proposed. In the wireless relay method, coordination with the Quality of Service (QoS) has been established, and the signal transmission output is controlled or the channel is changed (for example, see Patent Literature 1). According to the wireless relay method of Patent Reference 1, the radio control on the congested sections is performed by adjusting the signal transmission electricity, the pattern, and/or gain, based on the determination that the QoS metrics of the selected route falls below the QoS threshold.

Furthermore, a wireless mesh network where each node performs beam forming (control the directivity of the radio wave) has been proposed as well (for example, see Non-patent Reference 1). More specifically, according to the wireless relay method in the wireless mesh network in Non-Patent Literature 1, after the communication route for distributing the load is set, a new communication route for the link that could cause interference between different routes is set such that the interference is reduced, and the direction of the beam of the antenna is controlled based on the new communication route.

CITATION LIST

Patent Literature

[Patent Literature] Japanese Unexamined Patent Application Publication (Translation of PCT Application) No. 2007-505565

[Non-patent Literature] Jaturong Sangiamwong, Atsushi Fujiwara, Tomoyuki Ohya: "A Study on Interference-Aware Beamforming Control in CSMA/CA-Based Wireless Mesh Networks" The Institute of Electronics, Information and Communication Engineers, Technical report of IEICE. RCS, Vol. 106, No. 25, RCS2006-11, pp. 61-66, April, 2006.

SUMMARY OF INVENTION

Technical Problem

However, with the wireless relay apparatus and wireless relay method according to Patent Reference 1 and Non-patent Reference 1, there is a problem that high-quality data transmission cannot be performed.

That is, the wireless relay method according to Patent Reference 1, the wireless control is performed through trial and error depending on the variation in the QoS metrics.

For this reason, large variation in the QoS metrics increases the control width of the wireless control, and the transmission bandwidth that can be secured significantly changes as well. As a result, it is difficult to secure stable transmission quality.

Furthermore, according to the wireless relay method in Non-patent Reference 1, since the load in the traffic is distributed and the communication route itself is reconfigured, a significant amount of packets being transmitted is likely to be missed. Therefore, similar to the wireless relay method according to Patent Reference 1, it is likely to be difficult to maintain stable transmission quality.

Furthermore, in the wireless relay method according to Non-patent Reference 1, the use of the same frequency is a premise. Only the directivity control of the electric wave is performed with respect to a new communication route that is reset based on the estimation result of the network load. Accordingly, when the wireless relay apparatuses are concentrated, it does not necessarily reduce the interference on the electric wave or reduce the network load.

As described above, with the wireless relay apparatus and the wireless relay method according to Patent Reference 1 which perform wireless control through trial and error with the QoS metrics only, and with the wireless relay apparatus and the wireless relay method according to Non-patent Reference 1 that reconfigures the communication route transmit the data at high-quality.

The present invention has been conceived in view of the abovementioned problem, and it is an object of the present invention to provide a wireless relay apparatus and wireless relay method capable of transmitting data at high quality.

Solution to Problem

In order to solve the problem above, a wireless relay apparatus according to the present invention is a wireless relay apparatus for relaying data to be transmitted and received, between at least two communication apparatuses among communication apparatuses that communicate with each other wirelessly, the wireless relay apparatus including: a communication unit configured to transmit and receive data wirelessly; a communication failure determining unit configured to determine whether or not a communication failure is caused in the wireless relay apparatus by a radio wave interference; a data flow determining unit configured to determine, when the communication failure determining unit determines that there is the communication failure, whether or not flows intersect each other in the wireless relay apparatus, by identifying a flow of data transmitted to and received from the communication unit; and an adjustment unit configured to adjust transmission characteristics of a type according to a result of the determination by the data flow determining unit, among types of transmission characteristics of radio used in at least one of the communication unit and the communication apparatuses. For example, the wireless network is configured with the communication apparatuses and the wireless relay apparatus, and each of the communication apparatuses is a transmission terminal, a receiving terminal, or another wireless relay apparatus and others. In addition, the transmission characteristics of the radio include frequency and directivity of radio.

With this, it is possible to adjust the appropriate type of transmission characteristic depending on the case where the flows of data intersect each other and the case where the flows of data do not intersect each other. As a result, it is possible to solve communication failure such as a congestion and transmission error, allowing high-quality data transmission. In other words, when the flows intersect each other, it is difficult to solve the congestion caused by the radio wave interference merely by adjusting the directivity of radio. However, in the present invention, the type of transmission characteristics other than the directivity of radio is adjusted. Thus, it is possible to easily solve the congestion and the transmission error caused by the radio wave interference. Furthermore, regardless of whether or not the flows intersect each other, an attempt to solve the congestion caused by the radio wave interference merely by adjusting the radio frequency results in a significant change in the frequency while securing a wide transmission bandwidth. As a result, it is difficult to stabilize the transmission quality. However, in the present invention, in the case where the communication failure such as the congestion and communication error can be solved by adjusting the transmission characteristics other than frequency when the flows do not intersect each other, for example, the communication failure is solved through the adjustment of the transmission characteristics other then the frequency. Thus, it is possible to suppress the change in the transmission bandwidth that should be secured and the change in frequency, which allows high-quality transmission.

Furthermore, when the data flow determining unit determines that the flows intersect each other, the adjustment unit may be configured to adjust, as the transmission characteristics, a frequency in the communication unit and a frequency in a communication apparatus that is on one of the flows, such that a frequency used for the one of the flows that intersect each other and a frequency used for the other of the flows are adjusted to different frequencies.

With this, the frequency of one flow differs from the frequency of the other flow. Accordingly, it is possible to appropriately solve the communication failure such as the congestion and transmission error caused by the radio wave interference.

Furthermore, when the data flow determining unit determines that the flows do not intersect each other, the adjustment unit may be configured to increase directivity of radio wave in the communication unit as the transmission characteristics, such that a direction of a radio wave which carries the data transmitted to and received from the communication unit is restricted to a direction along the identified flow. For example, the adjustment unit increases the directivity of the radio wave of the communication unit, such that the direction of the radio wave that can be received by the communication unit is restricted to the communication apparatus which is a transmission source on the identified flow.

With this, only the radio wave outputted from the communication apparatus which is the transmission source on the flow, and the radio wave outputted from the other communication apparatus is not received. Thus, it is possible to suppress the radio wave interference and solve the communication failure such as the congestion and the transmission error.

Furthermore, when the data flow determining unit determines that the flows do not intersect each other, the adjustment unit may be configured to increase a directivity of radio wave outputted from a communication apparatus around the wireless relay apparatus, such that a direction of radio wave outputted from a communication apparatus which is a transmission source around the wireless relay apparatus and which is other than a communication apparatus on the identified flow is restricted to another communication apparatus which is a destination.

With this, it is possible to prevent the radio wave unnecessary for the wireless relay apparatus outputted from the communication apparatus which is the transmission source not on the flow from reaching the wireless relay apparatus, and to suppress the radio wave interference and solve the communication failure such as the congestion and the transmission error.

Furthermore, the wireless relay apparatus further includes a position obtaining unit configured to obtain a position of a communication apparatus on the flow identified by the data flow determining unit, in which the adjustment unit may be configured to increase the directivity of the radio wave in the communication unit, such that a direction of the radio wave is restricted to a direction connecting a position of the communication apparatus obtained by the position obtaining unit and a position of the wireless relay apparatus.

With this, the position of the communication apparatus on the flow is obtained, and the directivity of radio wave is adjusted according to the position. Thus, it is possible to accurately adjust the directivity of the radio wave.

Furthermore, the data flow determining unit may be configured to identify the flow of the data based on information indicating a transmission source and a destination of the data included in the data received by the communication unit.

This allows appropriate identification of the flow of data.

Furthermore, the wireless relay apparatus further includes a routing unit configured to create route information indicating a route for relaying the data, in which the data flow determining unit is configured to identify the flow of the data by referring to the route information.

This allows more appropriate identification of the flow of data.

Furthermore, the communication unit is configured to receive data that is not relayed by the wireless relay apparatus, and the data flow determining unit may be further configured to identify the flow of the data transmitted to and received from, between the communication apparatuses except the wireless relay apparatus, based on information which is included in the data that is not relayed and that is received by the communication unit, the information indicating a transmission source and a destination of the data.

This allows identification of a flow other than the flow of data relayed by the wireless relay apparatus. Accordingly, it is possible to appropriately adjust the transmission characteristics, based on the detailed status of flows around the wireless relay apparatus.

Note that, the present invention can be implemented not only as the wireless relay apparatus, but also as a method or a program thereof, and a recording medium for storing the program.

ADVANTAGEOUS EFFECTS OF INVENTION

The wireless relay apparatus according to the present invention enables low-delay and high-quality transmission without packet loss by performing a wireless control taking the traffic flow into consideration.

BRIEF DESCRIPTION OF DRAWINGS

FIG. 11 is a flowchart showing the operation of the dataflow determining unit according to Embodiment 2 of the present invention.

FIG. 14A is a diagram showing the use of the present invention.

FIG. 14B is a diagram showing the use of the present invention.

FIG. 14C is a diagram showing the use of the present invention.

FIG. 14D is a diagram showing the use of the present invention.

FIG. 14E is a diagram showing the use of the present invention.

FIG. 16 is a diagram showing the congestion control by the conventional wireless relay apparatuses.

DESCRIPTION OF EMBODIMENTS

Figure 1:
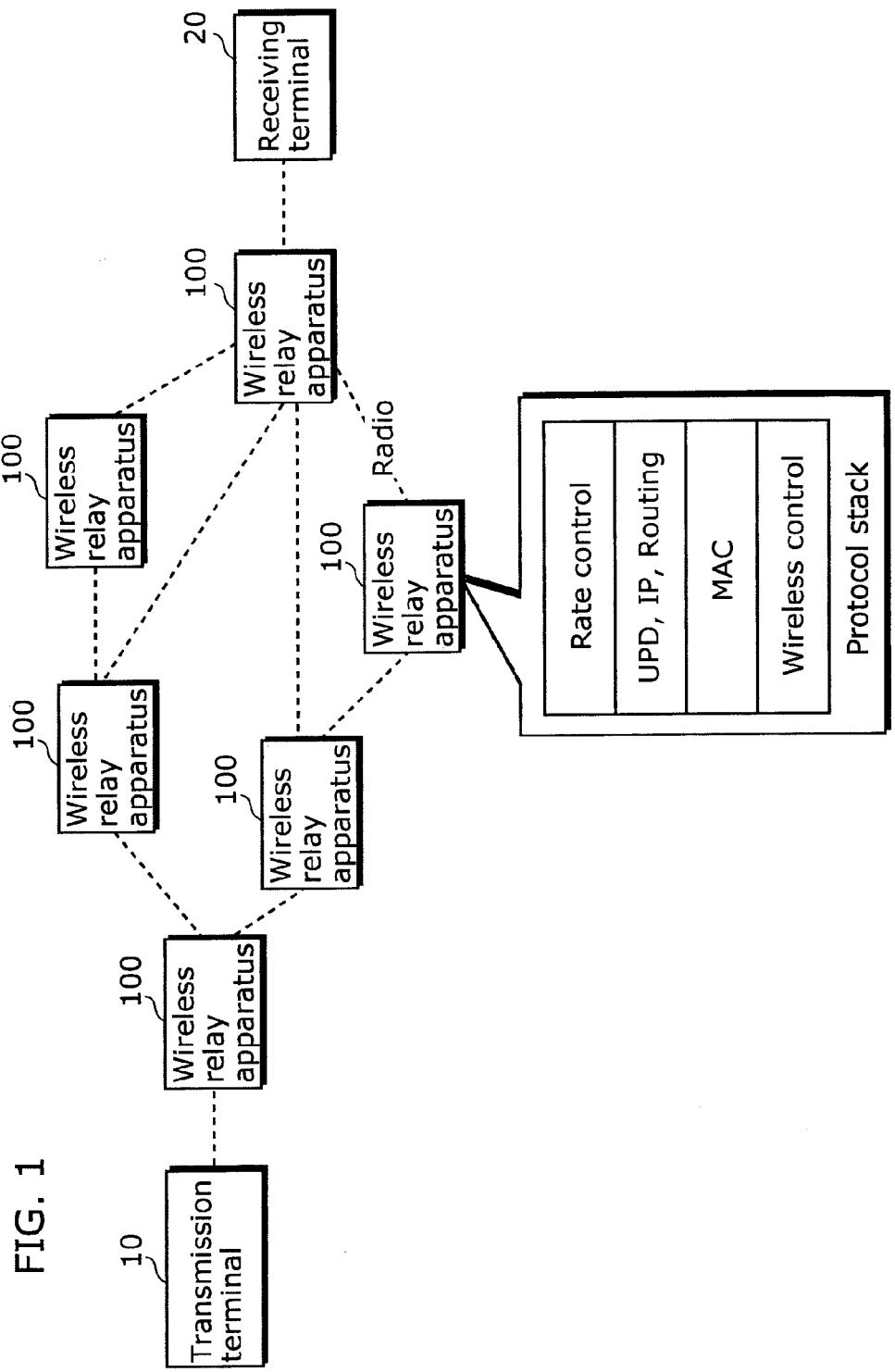
FIG. 1 is a diagram for describing the network, including wireless relay apparatuses according to Embodiment 1 of the present invention.

Embodiments of the present invention shall be described hereafter with reference to the drawing.

Embodiment 1

FIG. 1 is a diagram for describing a network configured including the wireless relay apparatuses according to Embodiment 1 of the present invention.

The network is configured, for example, as an ad-hoc network, and includes a transmission terminal 10, wireless relay apparatuses 100, and a receiving terminal 20.

The wireless relay apparatus 100 performs wireless relaying by protocol stack. The protocol stack includes a wireless control layer, a Media Access Control (MAC) layer, a transport layer related to the User Datagram Protocol (UDP), the Internet Protocol (IP) and routing, and a rate control layer.

The wireless control layer controls the allocation of the frequency, radio wave output (intensity), and directivity.

The MAC layer is included in the data link layer, and performs control using the access methods such as 802.11a, 802.11b, and Time Division Multiple Access (TDMA) method.

The rate control layer controls the amount of transmission at an application level. More specifically, the control is achieved by the scheduling algorithms (packet scheduling) such as the Weighted Fair Queuing (WFQ) and the Round Robin.

Here, the routing (routing function) represents a function for selecting an optimal route from the transmission terminal 10 to the receiving terminal 20 via one or more wireless relay apparatuses 100, and for transmitting the data through the route.

The routing function may be achieved on the IP packet level, or in the data link layer, as in 802.11s. The routing function can be achieved through the routing protocol. Representative routing protocols include the Dynamic Source Routing (DSR) Protocol and the Ad hoc On-Demand Distance Vector (AODV). Generally, the route information is created by the routing protocol.

The transmission terminal 10 and the receiving terminal 20 are configured, for example, as a camera or a personal computer (PC).

Note that, each of the transmission terminal 10 and the receiving terminal 20 may be a mobile phone, television, or on-vehicle terminal apparatus on a car navigation system. They may be any apparatus as long as data communication is performed, may be used for any purpose, and may include any function.

Furthermore, the transmission terminal 10, the wireless relay apparatus 100 and the receiving terminal 20 may be a mobile terminal which is mobile or a fixed terminal which is immobile.

Furthermore, the network in Embodiment 1 is configured as an ad-hoc network. However, it may be another wireless LAN, the Dedicated Short Range Communication (DSRC) network, or a mobile phone network, and the type and performance of the wireless medium in the network in the present invention are not limited.

Furthermore, the network in Embodiment 1 can transmit various data, not just video and audio, but text, still images, music, and control data.

Furthermore, in the present invention, the area where the network is used is not limited, and the data can be transmitted and received at high quality not just outside the house, but also inside the house.

Figure 2:
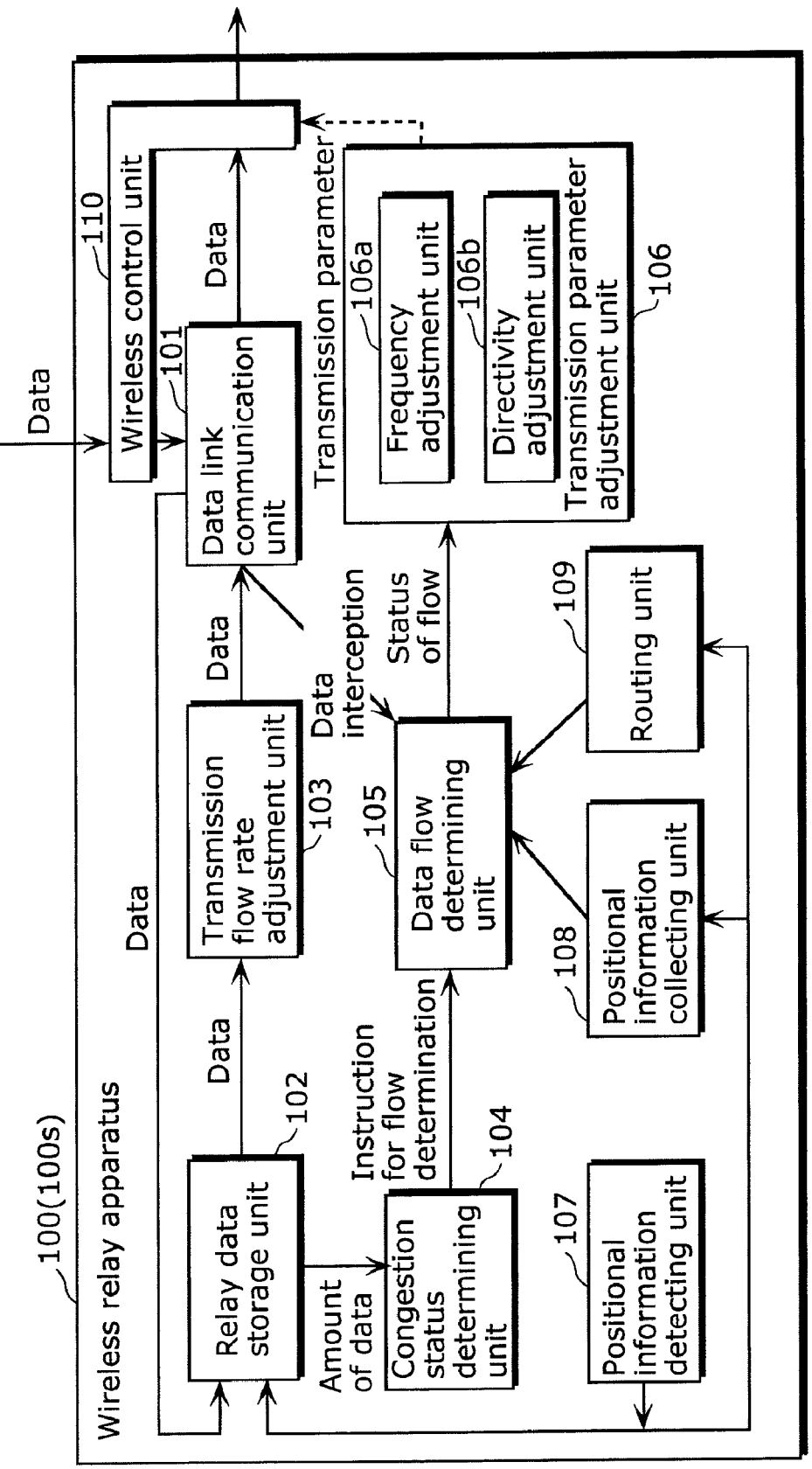
FIG. 2 is a diagram showing the structure of the wireless relay apparatus according to Embodiment 1 of the present invention.

FIG. 2 shows the structure of the wireless relay apparatus 100 according to Embodiment 1.

Each of the wireless relay apparatuses 100 included in the network has identical structure. The following specifically describes the structure of one wireless relay apparatus 100.

Note that, in the following description, one wireless relay apparatus 100 to be explained shall be referred to as an own relay apparatus 100$s$, and other wireless relay apparatuses 100 are referred to as other relay apparatuses 100$n$.

The wireless relay apparatus 100 (own relay apparatus 100$s$) includes a data link communication unit 101, a relay data storage unit 102, a transmission flow adjustment unit 103, a congestion status determining unit 104, a data flow determining unit 105, a transmission parameter adjustment unit 106, a positional information detecting unit 107, a positional information collecting unit 108, a routing unit 109, and a wireless control unit 110.

Note that, in Embodiment 1, the communication unit is configured as the data link communication unit 101 and the wireless control unit 110, the congestion determining unit is configured as the congestion status determining unit 104, and the adjustment unit is configured as the transmission parameter adjustment unit 106.

Furthermore, in Embodiment 1, the position obtaining unit is configured as the positional information detecting unit 107 and the positional information collecting unit 108.

The wireless control unit 110 includes an antenna, and transmits and receives radio wave.

Furthermore, the wireless control unit 110 changes the directivity of the radio wave (the direction of the antenna) received by the wireless control unit 110 itself according to the transmission parameter which is adjusted by the transmission parameter adjustment unit 106, and changes the frequency of radio wave transmitted to and received from the other relay apparatuses 100$n$. Furthermore, when the wireless control unit 110 receives radio wave from the other relay apparatuses 100$n$ which is the transmission source or the transmission terminal 10, the wireless control unit 110 outputs the data indicated by the radio wave to the data link communication unit 101. When the wireless control unit 110 receives data from the data link communication unit 101, the wireless control unit 110 transmits the data to the other relay apparatus 100n or the receiving terminal 20 which is the destination through radio wave.

The data link communication unit 101 transmits the packetized data indicating video, audio, and text to the other relay apparatuses 100n or the receiving terminal 20 via the wireless control unit 110. More specifically, the data link communication unit 101 obtains the data stored in the relay data storage unit 102 via the transmission flow adjustment unit 103, and outputs the data to the wireless control unit 110.

Furthermore, when receiving the data (packet) from the other relay apparatuses 100n or the transmission terminal 10 via the wireless control unit 110, the data link communication unit 101 stores the data in the relay data storage unit 102.

The relay data storage unit 102 classifies, for each destination, the packets from the other relay apparatuses 100n or the transmission terminal 10 received by the data link communication unit 101, and accumulates the received packets. That is, the relay data storage unit 102 includes buffers each of which corresponds to a destination, and the received packets are stored in the buffer corresponding to the destination of the packet.

Furthermore, when the relay data storage unit 102 obtains the positional information to be described later from the positional information detecting unit 107, the relay data storage unit 102 includes the obtained positional information in the packet that is to be taken out by the transmission flow adjustment unit 103 and output from the data link communication unit 101.

With this, the packet transmitted from the data link communication unit 101 includes the positional information of the own relay apparatus 100s that transmitted the packet.

As a result, the other relay apparatus 100n that received the packet can identify the position of the own relay apparatus 100s of the transmission source based on the packet.

The transmission flow rate adjustment unit 103 adjusts the transmission flow rate of the packet classified for each destination. More specifically, the transmission flow rate adjustment unit 103 takes the packet sufficient for filling the predetermined transmission flow rate out of the relay data storage unit 102, and outputs the packets taken out to the data link communication unit 101.

As described above, each packet transmitted from the other relay apparatus 100n or the transmission terminal 10 by the wireless control unit 110 which is the transmission source, the data link communication unit 101, the relay data storage unit 102 and the transmission flow rate adjustment unit 103 is temporarily stored in the relay data storage unit 102.

Subsequently, each packet is taken out of the relay data storage unit 102 according to the transmission flow rate adjusted by the transmission flow rate adjustment unit 103, and is transmitted to the other relay apparatus 100n or to a receiving terminal 20 which is the destination.

The congestion status determining unit 104 determines the status of congestion based on the amount of packet data stored in the relay data storage unit 102. That is, when the network is congesting, the packet received by the data link communication unit 101 increases and the amount of data in the relay data storage unit 102 increases. As a result, the buffer gradually overflows.

Thus, the congestion status determining unit 104 determines that there is congestion when the amount of packet data stored in the relay data storage unit 102 exceed a threshold for a predetermined period of time, and determines that there is no congestion when the amount of data does not exceeds the threshold. The threshold is, for example, the amount of data which is two-thirds of that of the maximum storage capacity of the relay data storage unit 102.

Subsequently, when it is determined that there is congestion, the congestion status determining unit 104 instructs the data flow determining unit 105 to determine a flow, an operation which is to be described later.

Note that, the congestion status determining unit 104 in Embodiment 1 determines whether or not there is congestion, based on the amount of data in the relay data storage unit 102. However, whether or not there is congestion may also be determined by other methods. For example, the congestion status determining unit 104 may determine whether or not there is congestion, based on, for example, the temporal change in an interval for retransmitting or transmitting the packets.

The positional information detecting unit 107 detects the geographical position of the own relay apparatus 100s using the Global Positioning System (GPS), for example, generates the positional information indicating the position, and outputs the positional information to the positional information collecting unit 108 and the relay data storage unit 102.

The positional information collecting unit 108 obtains the positional information of the own relay apparatus 100s outputted by the positional information detecting unit 107, and collects the positional information indicating the geographical position of one or more of the other relay apparatuses 100n positioned near the own relay apparatus 100s.

The positional information collecting unit 108 causes, for example, the wireless control unit 110 to broadcast the signals to prompt transmission of the positional information from each of the other relay apparatuses 100n, when collecting the positional information of each of the neighboring other relay apparatuses 100n.

As a result, the positional information detecting unit 107 in each of the other relay apparatuses 100n generates positional information, and the other relay apparatus 100n transmits a packet including the positional information.

With this, the packet including the positional information of each of the other relay apparatuses 100n is stored in the relay data storage unit 102 in the own relay apparatus 100s.

The positional information collecting unit 108 collects the positional information of the other relay apparatuses 100n from the packets stored in the relay data storage unit 102. The exchange of the positional information between the wireless relay apparatuses 100 is thus performed.

Subsequently, the positional information collecting unit 108 outputs the collected positional information of the other relay apparatuses 100n and the positional information of the own relay apparatus 100s obtained from the positional information detecting unit 107 to the data flow determining unit 105.

Note that, the positional information collecting unit 108 may detect the positions of the other relay apparatuses 100n based on an incoming direction of the radio wave from the other relay apparatuses 100n and the received electric intensity, and may generate positional information indicating the position.

The routing unit 109 generates the route information (routing table), and outputs the route information to the data flow determining unit 105.

When instructed by the congestion status determining unit 104 to determine the flow, the data flow determining unit 105 determines the status of traffic flow between the own relay apparatus 100s and the neighboring other relay apparatuses 100n, based on the route information outputted by the routing unit 109 and the data (packet) received by the data link communication unit 101 and the positional information output from the positional information collecting unit 108.

Note that, the status of traffic flow includes flows indicating from which wireless relay apparatus to which wireless relay apparatus the data flows, and the positions of each of the wireless relay apparatuses, and whether or not the flows intersect each other. The determination shall be hereafter referred to as flow determination.

The data flow determining unit 105 notifies the determined status of flow of the transmission parameter adjustment unit 106.

The transmission parameter adjustment unit 106 adjusts the transmission parameter indicating the frequency or directivity of the radio wave to be set by the wireless control unit 110, based on the status of flow determined by the data flow determining unit 105, and outputs the transmission parameter to the wireless control unit 110. That is, the transmission parameter adjustment unit 106 includes the frequency adjustment unit 106a and the directivity adjustment unit 106b.

When the flows in the own relay apparatus 100s intersect each other, the frequency adjustment unit 106a specifies the frequency of radio wave to be set for a predetermined flow, and outputs the transmission parameter indicating the frequency to the wireless control unit 110.

When the flows in the own relay apparatus 100s do not intersect each other, the directivity adjustment unit 106b specifies the reception directivity of the radio wave to be set for the own relay apparatus 100s, and outputs the transmission parameter indicating the directivity to the wireless control unit 110.

Figure 3:
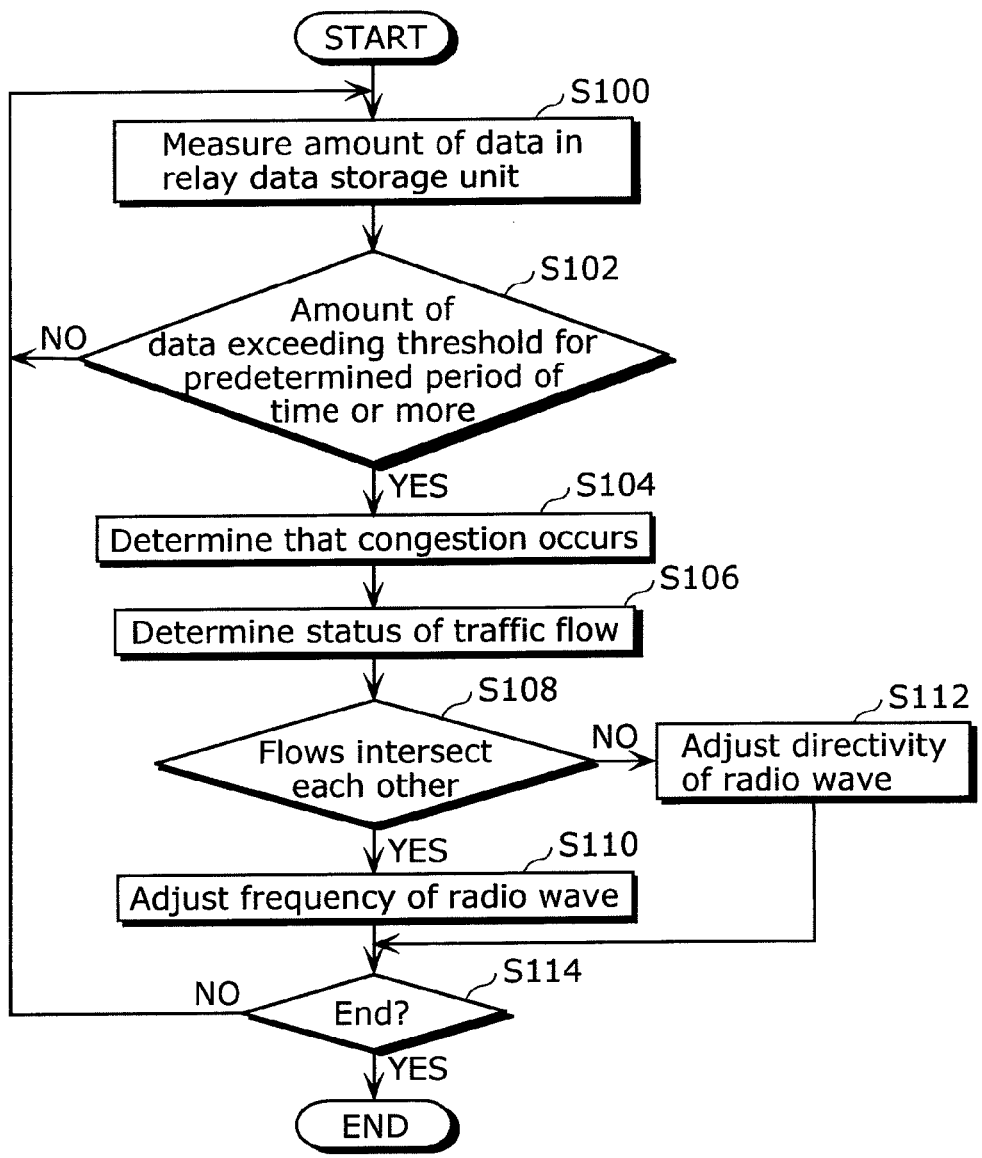
FIG. 3 is a flowchart showing the overall operations when suppressing the radio wave interference by the wireless relay apparatus according to Embodiment 1.

FIG. 3 is a flowchart showing the overview of the operations by the wireless relay apparatus 100 according to Embodiment 1 when suppressing the radio wave interference.

First, the congestion status determining unit 104 measures the amount of packet data stored in the relay data storage unit 102 (step S100). For example, the congestion status determining unit 104 measures 5 MB as the amount of packet data stored in the relay data storage unit 102 with the maximum storage capacity of 10 MB.

Here, the congestion status determining unit 104 determines whether or not the measured amount of data exceeds the threshold for a predetermined period of time or more (step S102). The congestion status determining unit 104 determines whether or not the amount of data exceeds two-thirds of the maximum storage capacity of the relay data storage unit 102 for one minute or more, for example.

As a result, when it is determined that the amount of data exceeds the threshold (YES in step S102), the congestion status determining unit 104 determines that there is congestion (Step S104).

On the other hand, when it is determined that the amount of data does not exceed the threshold (NO in step S102), the congestion status determining unit 104 repeats the process from step S100.

Next, when it is determined in step S104 that there is congestion, the data flow determining unit 105 determines the status of flow in the traffic (step S106).

Furthermore, based on the determination result, the data flow determining unit 105 determines whether or not the flows intersect each other in the own relay apparatus 100s (step S108).

Here, when it is determined that the flows intersect each other (YES in step S108), the data flow determining unit 105 instructs the frequency adjustment unit 106a in the transmission parameter adjustment unit 106 to adjust the transmission parameter to a value according to the status of flow.

As a result, the frequency adjustment unit 106a sets a frequency used for a predetermined flow among the intersecting flows, to a frequency different from that of used for the other flow. More specifically, the frequency adjustment unit 106a notifies the wireless control unit 110 in the own relay apparatus 100s of the transmission parameter indicating, to the wireless control unit 110 in the own relay apparatus 100s and each of the other relay apparatuses 100n which are the destination or the transmission source on the predetermined flow, a frequency different from the frequency in the other flow. With this, the wireless control unit 110 sets the frequency of the radio wave used for the predetermined flow indicated by the transmission parameter, and sets the frequency of the other relay apparatuses 100n to a frequency indicated by the transmission parameter (step S110).

Note that, the wireless control unit 110 sets the frequency of the other relay apparatus 100n by broadcasting the signal indicating the frequency. The frequency adjustment unit 106a of the other relay apparatus 100n that received the signal adjusts the transmission parameter to a frequency indicated by the signal.

Furthermore, when it is determined that the flows do not intersect each other in step S108 (NO in step S108), the data flow determining unit 105 instructs the directivity adjustment unit 106b in the transmission parameter adjustment unit 106 to adjust the transmission parameter to a value according to the status of the flow.

As a result, the directivity adjustment unit 106b adjusts the transmission parameter indicating the directivity of the radio wave such that the radio waves on the own relay apparatus 100s and the other relay apparatus 100n which is on a flow different from the flow for the own relay apparatus 100s and neighboring the own relay apparatus 100s do not interfere each other, and notifies the transmission parameter of the wireless control unit 110 in the own relay apparatus 100s.

Accordingly, the wireless control unit 110 sets the directivity of the radio wave received by the wireless control unit 110 itself to a directivity indicated by the transmission parameter (step S112).

When the frequency or directivity of the radio wave is adjusted in step S110 and step S112, the congestion status determining unit 104 determines whether or not to end the process for suppressing the radio wave interference (step S114), ends the process for suppressing radio wave interference when it is determined that the process should end (YES in step S114), and repeats the process from step S100 when it is determined that the process should not end (NO in step S114).

Figure 4:
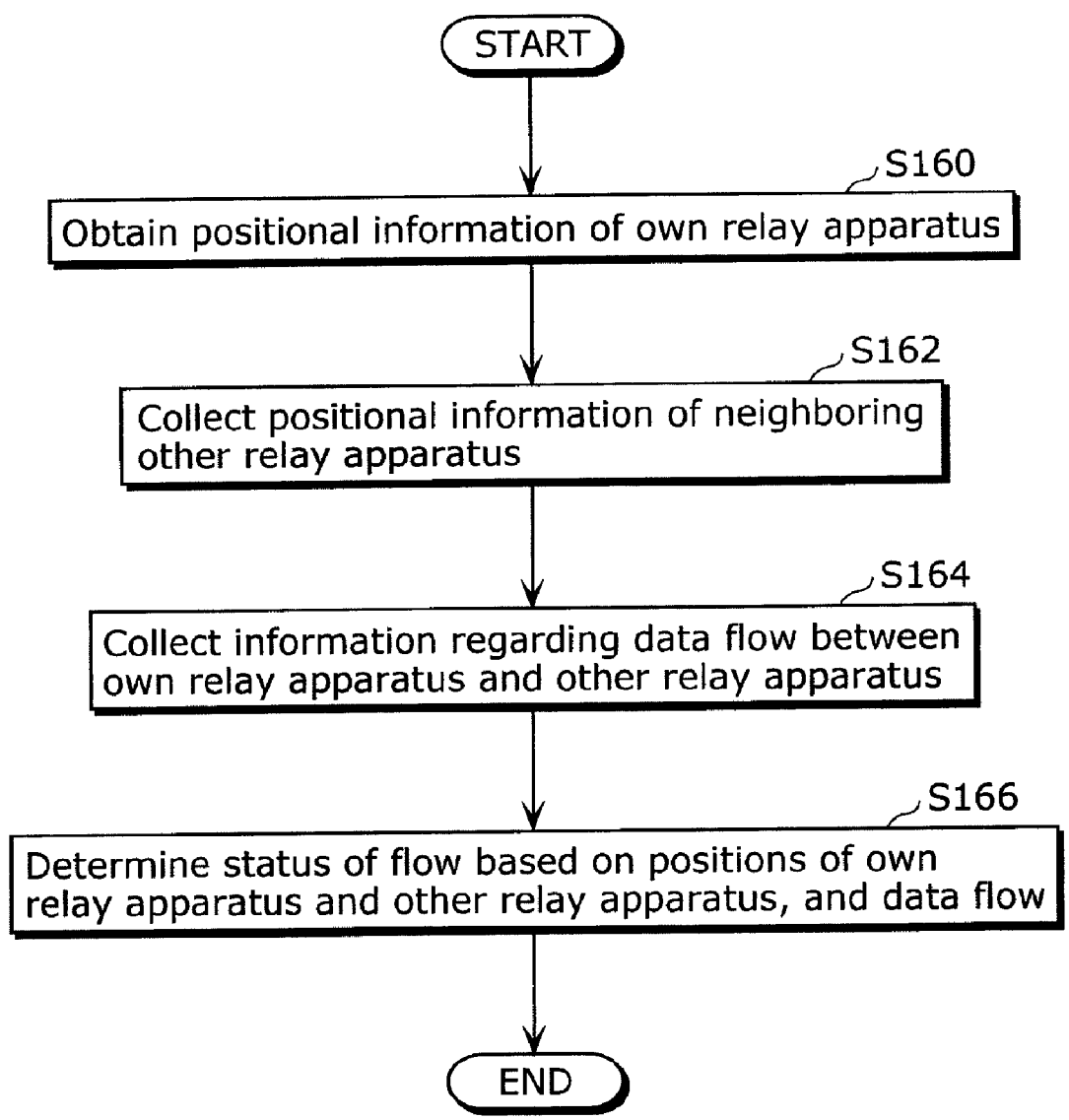
FIG. 4 is a flowchart showing the operation of the dataflow determining unit according to Embodiment 1 of the present invention.

FIG. 4 is a flowchart showing the operations by the data flow determining unit 105 according to Embodiment 1.

The data flow determining unit 105 obtains the positional information of the own relay apparatus 100s from the positional information detecting unit 107 (step S160).

Furthermore, the data flow determining unit 105 collects the positional information of the neighboring other relay apparatuses 100n from the positional information collecting unit 108 (step S162).

Furthermore, the data flow determining unit 105 collects the route information between the own relay apparatus 100s and the neighboring other relay apparatuses 100n, which is generated by the routing unit 109, and information indicating the actual communication route indicated by the packets received from and transmitted to the data link communication unit 101 as the flow information regarding the data flow (step S164).

Subsequently, the data flow determining unit 105 determines the status of flow in the own relay apparatus 100s, based on the positions of the own relay apparatus 100s and the neighboring other relay apparatuses 100n indicated by the positional information and the flows of data indicated by the flow information (step S166).

Here, the following describes a specific example of flow determination.

Figure 5:
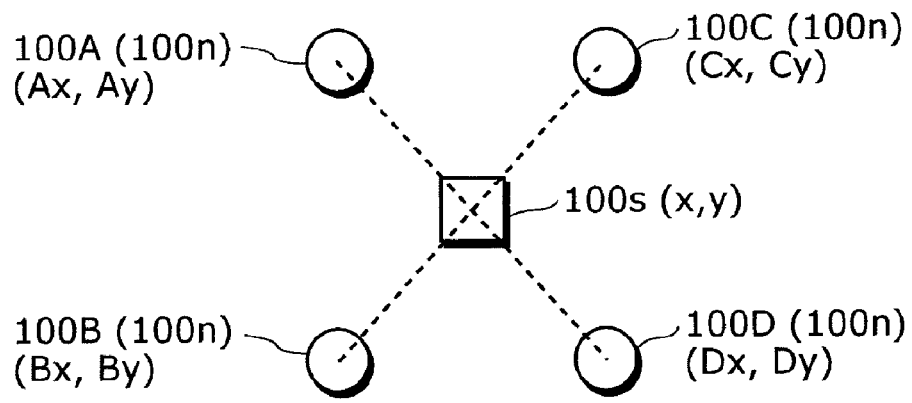
FIG. 5 is a diagram showing positions of an own-relay apparatus and other relay apparatuses according to Embodiment 1.

FIG. 5 shows the positions of the own relay apparatus 100s and the other relay apparatuses 100n.

For example, there are four other relay apparatuses 100n (another relay apparatus 100A, another relay apparatus 100B, another relay apparatus 100C, and another relay apparatus 100D) near the own relay apparatus 100s. In this case, the data flow determining unit 105 in the own relay apparatus 100s obtains positional information indicating the position of the own relay apparatus 100s (x, y), from the positional information detecting unit 107 of the own relay apparatus 100s via the positional information collecting unit 108.

Furthermore, the dataflow determining unit 105 in the own relay apparatus 100s obtains, from the positional information collecting unit 108 in the own relay apparatus 100s, the positional information indicating the position of the other relay apparatus 100A (Ax, Ay), the positional information indicating the position of the other relay apparatus 100B (Bx, By), the positional information indicating the position of the other relay apparatus 100C (Cx, Cy), and the positional information indicating the position of the other relay apparatus 100D (Dx, Dy).

Figure 6:
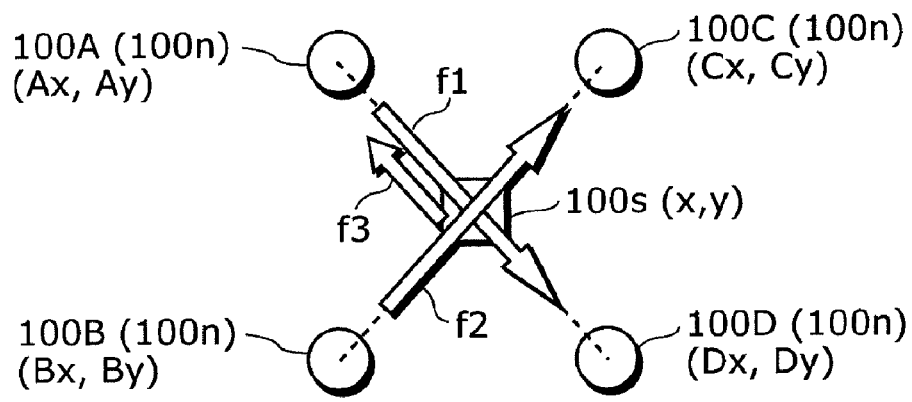
FIG. 6 is a diagram showing the data flow according to Embodiment 1 of the present invention.

FIG. 6 shows the flows of data.

For example, when the own relay apparatus 100s and the other relay apparatuses 100A, 100B, 100C, and 100D are arranged as shown in FIG. 5, the dataflow determining unit 105 in the own relay apparatus 100s identifies a data flow f1 flowing from the other relay apparatus 100A to the other relay apparatus 100D via the own relay apparatus 100s, a data flow f2 flowing from the other relay apparatus 100B to the other relay apparatus 100C via the own relay apparatus 100s, and a data flow f3 flowing from the own relay apparatus 100s to the other relay apparatus 100A.

The dataflow determining unit 105 refers to the route information generated by the routing unit 109, and identifies the abovementioned flows f1, f2, and f3, using the IP addresses of the transmission source or destination indicated in the header of the packet received by the data link communication unit 101. More specifically, the dataflow determining unit 105 identifies the flow f1 based on the packet where the IP address of the other relay apparatus 100A is described as the IP address of the transmission source, and the IP address of the other relay apparatus 100D is described as the IP address of the destination.

Likewise, the dataflow determining unit 105 identifies the flow f2 based on the packet where the IP address of the other relay apparatus 100B is described as the IP address of the transmission source, and the IP address of the other relay apparatus 100c is described as the IP address of the destination.

In the same manner, the dataflow determining unit 105 identifies the flow f3 based on the packet where the IP address of the own relay apparatus 100s is described as the IP address of the transmission source, and the IP address of the other relay apparatus 100A is described as the IP address of the destination. More specifically, the dataflow determining unit 105 creates the flows f1, f2, and f3 as described above by recording, in the route information, the transmission source and the destination of the actually received packet, after the routing by the routing protocol in the routing unit 109 is established. More specifically, the routing above is achieved by the generally known dynamic routing scheme. The dynamic routing regularly updates the route information using the route information received from the other terminal via the routing protocol such as the DSR and the AODV.

The routing unit 109 can establish the routing in the dynamic routing scheme and can determine the destination of the received packet.

Furthermore, the dataflow determining unit 105 can determine whether or not the traffic flows intersect each other in the own relay apparatus 100s, based on the data flows described above (flows f1, f2, and f3) and the positions of the own relay apparatus 100s and the other relay apparatuses 100A, 100B, 100C, and 100D.

More specifically, the dataflow determining unit 105 identifies the physical positions of the own relay apparatus 100s and the other relay apparatuses 100A, 100B, 100C, and 100D as (x, y), (Ax, Ay), (Bx, By), (Cx, Cy), and (Dx, Dy), respectively, by obtaining the positional information of each of the apparatuses.

Furthermore, as described above, the dataflow determining unit 105 identifies the flows f1, f2, and f3 as data flow.

Subsequently, the dataflow determining unit 105 determines that the traffic flows intersect each other as shown in FIG. 6, based on the identified positions and the flows.

Note that, the dataflow determining unit 105 may determine whether or not the flows intersect each other, based on only the flows f1, f2 and f3, that is, whether or not there are flows in the own relay apparatus 100s. In this case, the dataflow determining unit 105 determines that the multiple flows intersect each other if the own relay apparatus 100s is relaying the multiple flows, and determines that the multiple flows do not intersect each other if the own relay apparatus 100s is not relaying the multiple flows.

Based on this result, for example, in order to suppress the radio wave interference, with the frequency of the other relay apparatuses 100A to 100D set in the channel A, the frequency of the other relay apparatus 100B and the other relay apparatus 100C is changed from the channel A to the channel B, and the own relay apparatus 100s changes the frequency of the flow f2 from the channel A to the channel B. More specifically, the frequency adjustment unit 106a in the own relay apparatus 100s changes the frequency of flow f2 to the channel B, when the channel A is set to all of the flows and it is determined that the flows intersect each other.

Figure 7:
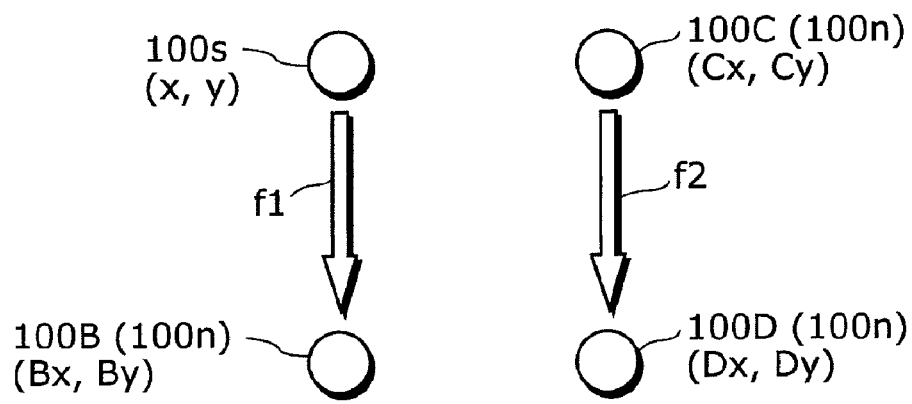
FIG. 7 is a diagram showing other data flows according to Embodiment 1 of the present invention.

FIG. 7 shows other data flows.

For example, the dataflow determining unit 105 in the own relay apparatus 100s identifies the flow f1 in which the data flows from the own relay apparatus 100s to the other relay apparatus 100B. Similar to the description above, the dataflow determining unit 105 identifies the flow f1 described above, using the route information generated by the routing unit 109 and the IP addresses of the transmission source and the destination indicated by the header of the packet transmitted and received by the data link communication unit 101. More specifically, the dataflow determining unit 105 identifies the flow f1 based on the packet where the IP address of the own relay apparatus 100s is described as the IP address of the transmission source and the IP address of the other relay apparatus 100B is described as the IP address of the destination.

Here, near the own relay apparatus 100s, there is another flow f2 in which the data flows from the other relay apparatus 100C to the other relay apparatus 100D.

However, even if the packet in the flow f2 is received by the data link communication unit 101, the dataflow determining unit 105 in the own relay apparatus 100s does not analyze that packet. This is because the relaying apparatus (destination) indicated by the packet is not the own relay apparatus 100s.

As a result, the dataflow determining unit 105 identifies only the flow f1, without identifying the flow f2.

Furthermore, the dataflow determining unit 105 obtains the positional information of each of the own relay apparatus 100s and the other relay apparatuses 100B, 100C, and 100D, and identifies the positions of the apparatuses, (x, y), (Bx, By), (Cx, Cy), and (Dx, Dy), respectively. Here, the dataflow determining unit 105 keeps track of the existence (position) of the other relay apparatus 100C and the other relay apparatus 100D, and determines that there is the flow f2 which do not intersect the flow f1 in the own relay apparatus 100s, when the congestion occurs due to the radio wave interference with only the flow f1 is identified. More specifically, the dataflow determining unit 105 determines that the radio waves in the two flows f1 and f2, which are the two flows that do not intersect each other in the own relay apparatus 100s interfere each other.

Based on this result, in order to suppress radio wave interference, the own relay apparatus 100s increases the directivity of the received radio wave such that the own relay apparatus 100s does not receive radio wave from the other relay apparatus 100C.

Figure 8A:
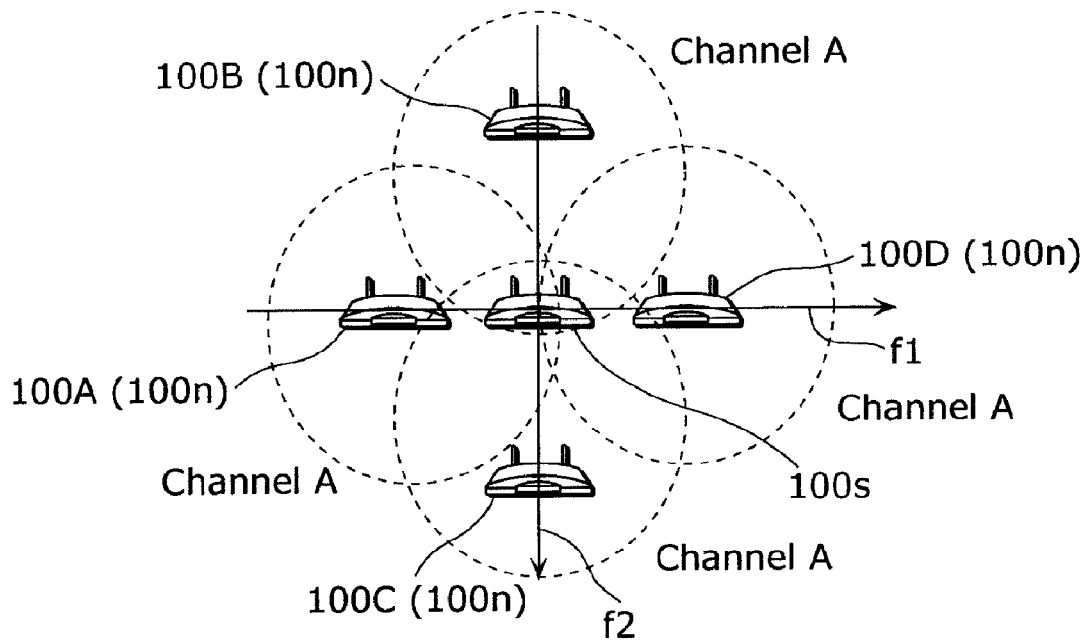
FIG. 8A is an explanatory diagram for explaining the frequency adjustment according to Embodiment 1 of the present invention.
Figure 8B:
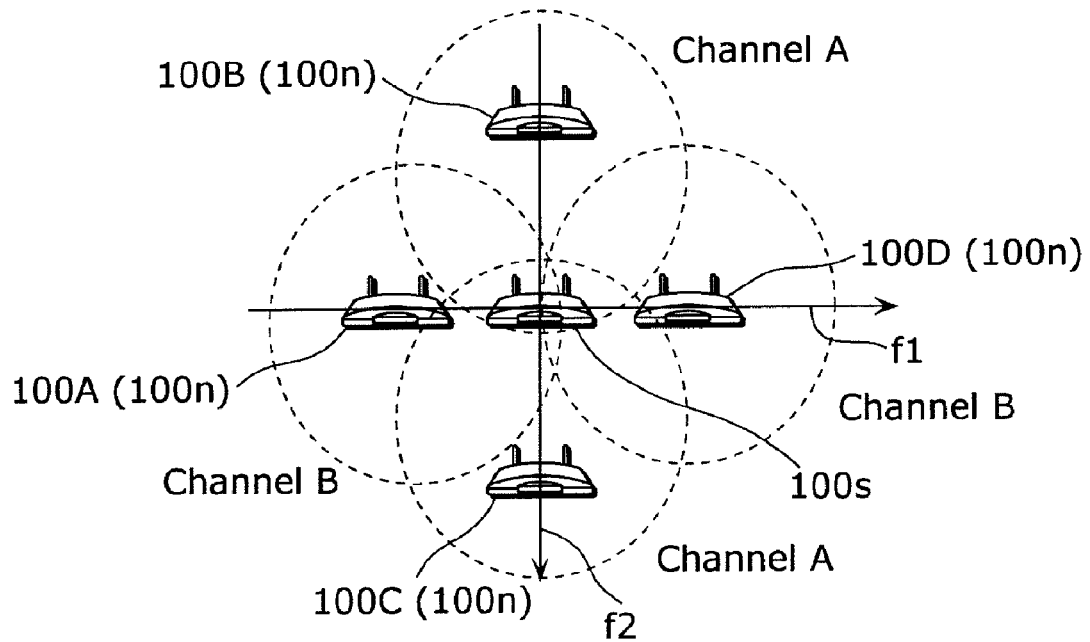
FIG. 8B is an explanatory diagram for explaining the frequency adjustment according to Embodiment 1 of the present invention.

FIGS. 8A and 8B are explanatory diagram for describing the adjustment of the frequency.

For example, as shown in FIG. 8A, the same frequency (channel A) is allocated to each of the own relay apparatus 100s and the neighboring other relay apparatuses 100A, 100B, 100C, and 100D. In this case, when it is determined that there is congestion due to radio wave interference, the own relay apparatus 100s determines that the flow f1 in which the data flows from the other relay apparatus 100A to the other relay apparatus 100D via the own relay apparatus 100s and the flow f2 in which the data flows from the other relay apparatus 100B to the other relay apparatus 100C via the own relay apparatus 100s intersect each other, based on the positions of the wireless relay apparatus and the data flow.

As a result, shown in FIG. 8B, the own relay apparatus 100s changes the frequency in the flow f1 from the channel A to the channel B, and causes the other relay apparatuses 100A and 100D in the flow f1 to change the frequency from the channel A to the channel B.

With this, different frequencies are allocated to the flow f1 and the flow f2. Thus, it is possible to suppress the radio wave interference between the flows to suppress the congestion.

As described above, when the dataflow determining unit 105 determines that the flows intersect each other, the frequency adjustment unit 106a adjusts the frequency of the wireless control unit 110 and the frequency of the other relay apparatuses 100n on the other flow, such that the frequency used for one of the intersecting flows is different from the frequency used for the other intersecting flow.

Figure 9A:
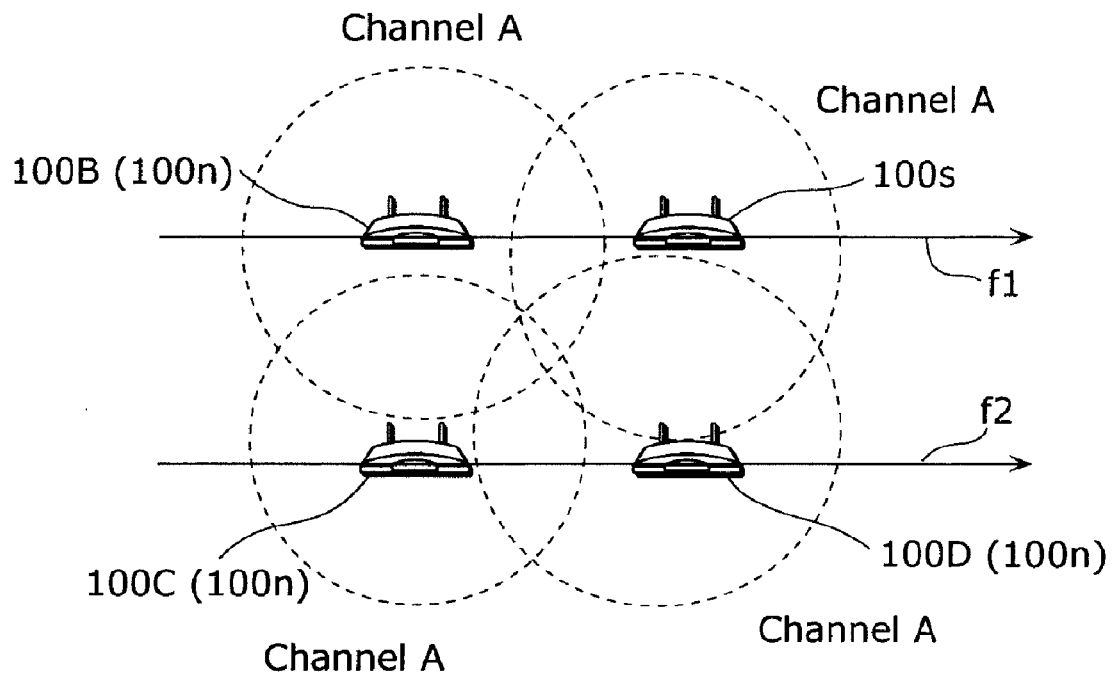
FIG. 9A is an explanatory diagram for explaining the directivity adjustment according to Embodiment 1 of the present invention.
Figure 9B:
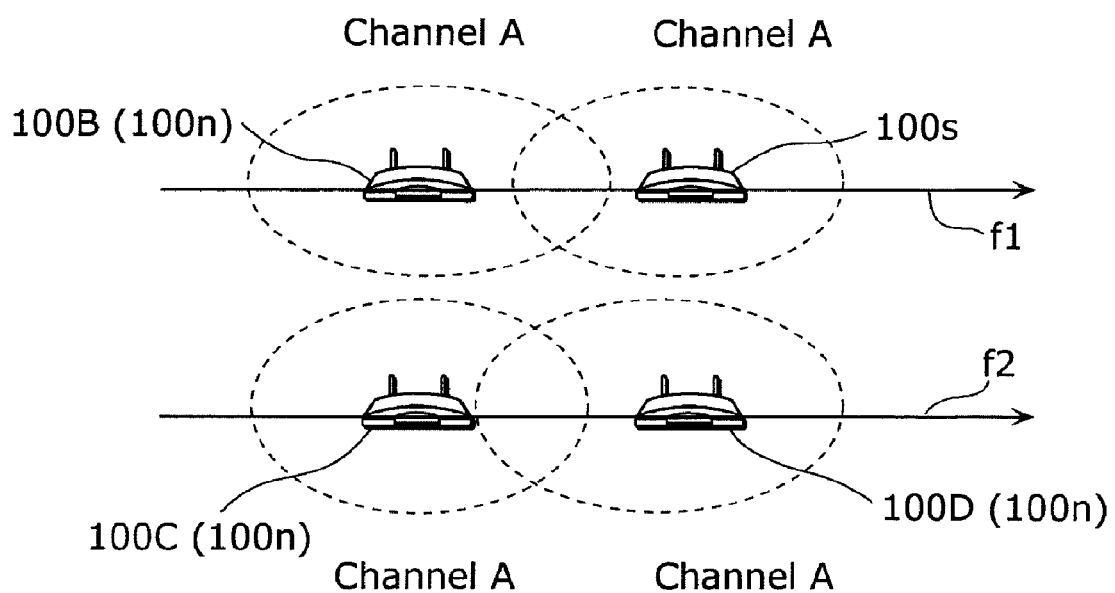
FIG. 9B is an explanatory diagram for explaining the directivity adjustment according to Embodiment 1 of the present invention.

FIGS. 9A and 9B are explanatory diagram for describing the adjustment of directivity.

For example, as shown in FIG. 9A, the same frequency (channel A) is allocated to each of the own relay apparatus 100s and the neighboring other relay apparatuses 100B, 100C, and 100D. In such a case, when the own relay apparatus 100s determines that there is congestion caused by the radio wave interference, the own relay apparatus 100s determines that the flow f1 in which the data flows from the other relay apparatus 100B to the own relay apparatus 100s and the flow f2 in which do not intersect each other, based on the positions of each of the wireless relay apparatus, and the data flow. More specifically, the own relay apparatus 100s can communicate with all of the other relay apparatuses 100B, 100C, and 100D, and the own relay apparatus 100s determines that the congestion occurs due to the radio wave interference caused by the flow which is not related to the own relay apparatus 100s.

As a result, the own relay apparatus 100s adjusts the directivity of the received radio wave such that only the radio wave from the other relay apparatus 100B which is the transmission source arrives, as shown in FIG. 9B.

With this, the radio wave interference caused by the flow f2 which is not related to the own relay apparatus 100s can be suppressed, and thereby suppressing the congestion.

As described above, when the dataflow determining unit 105 determines that the flows do not intersect each other, the directivity adjustment unit 106b increases the directivity of the received radio wave on the wireless control unit 110 such that the direction of the radio wave that can be received by the wireless control unit 110 is restricted to the other relay apparatus 100n which is the transmission source on the flow identified by the dataflow determining unit 105.

Furthermore, if it assumes that the congestion occurs in each of the other relay apparatuses 100B, 100C, and 100D in the same manner as the own relay apparatus 100s, the directivity of the radio wave is adjusted such that only the radio wave from each of the transmission sources arrives.

As described above, in Embodiment 1, it is possible to solve the congestion by adjusting the appropriate type of transmission characteristics suitable for the status, depending on the status where the data flows intersect each other and the status where the data flows do not intersect each other. This allows high-quality transmission of data.

Supposedly, even if an attempt is made to solve the congestion caused by the radio wave interference merely by adjusting the directivity of the radio when the flows intersect each other, it is difficult to solve the congestion.

However, in Embodiment 1, the frequency which is a type of transmission characteristics other than the directivity of the radio is adjusted, and thus it is possible to solve the congestion caused by the radio wave interference easily.

Furthermore, regardless of whether or not the flows intersects each other, an attempt to solve the congestion caused by the radio wave interference merely by adjusting the radio frequency result in a significant change in the frequency while securing a wide transmission bandwidth. As a result, it is difficult to stabilize the transmission quality.

However, in the present invention, in a state where the congestion is solved by adjusting the directivity, which is transmission characteristic other than the frequency, for example, in a state where the flows do not intersect each other, the directivity is adjusted and the congestion is solved. Accordingly, it is possible to suppress the change in the transmission bandwidth to secure and the change in frequency. This allows high quality transmission.

Note that, in Embodiment 1, the own relay apparatus 100s adjust the directivity of the received radio wave when the flows do not intersect each other. However, the directivity of the transmission radio wave of the other relay apparatus 100n, which is not related to the flow in the own relay apparatus 100s. More specifically, the directivity adjustment unit 106b in the own relay apparatus 100s increases the directivity of the radio wave output from the other relay apparatus 100n at the periphery of the own relay apparatus 100s other than the other relay apparatus 100n, and restricts the direction of the radio wave to another one of the other relay apparatuses 100n which is the destination.

Accordingly, this prevents the radio wave output from the other relay apparatus 100n which is not related to the flow of the own relay apparatus 100s and around the own relay apparatus 100s to the own relay apparatus 100s, and suppresses the congestion caused by the radio wave interference.

For example, as shown in FIG. 9B, the own relay apparatus 100s identifies the flow f1 when it is determined that the congestion occurs, and determines that the flow f1 do not intersect each other. Here, the own relay apparatus 100s identifies the positions of the other relay apparatuses 100C and 100D, and acknowledges that they are near the own relay apparatus 100s.

Thus, the own relay apparatus 100s determines that there is congestion due to the radio wave interference caused by the flow f2 between the other relay apparatuses 100C and 100D.

As a result, the wireless control unit 110 in the own relay apparatus 100s broadcasts the signal prompting the other relay apparatuses 100C and 100D to adjust the directivity of the transmission wave.

Upon reception of such signal, the other relay apparatuses 100C and 100D increases the directivity of the transmission wave of the respective wireless control units 110. More specifically, the other relay apparatus 100C increases the directivity of the radio wave such that the direction of the output radio wave is restricted to the other relay apparatus 100D which is the destination. More specifically, the frequency adjustment unit 106a in the other relay apparatus 100C identifies the position of the other relay apparatus 100D based on the status of the flow notified by the dataflow determining unit 105, and adjusts the transmission parameter to a value indicating a directivity such that radio wave is output towards the position.

Furthermore, in the case described above, the directivity adjustment unit 106b in the own relay apparatus 100s may lower the output of the radio wave while increasing the directivity of the radio wave output from the other relay apparatus 100n in the periphery of the own relay apparatus 100s.

With this, it is possible to prevent the radio wave output from the other relay apparatus 100n which is in the periphery of the own relay apparatus 100s and not related to the flow of the own relay apparatus 100s from reaching the own relay apparatus 100s.

Embodiment 2

The wireless relay apparatus 100 according to Embodiment 1 does not interpret the communication content of the packet when the wireless relay apparatus 100 receives the packets not related to the apparatus itself. However, the wireless relay apparatus according to the present invention interprets the communication content of the packet and process the packet, even if the received packet is not related to the apparatus itself.

Accordingly, in the second embodiment, it is possible to skip the process for identifying the positions of the own relay apparatus and neighboring other relay apparatuses as shown in Embodiment 1, and it is also possible to skip the process related to the information regarding routing.

Figure 10:
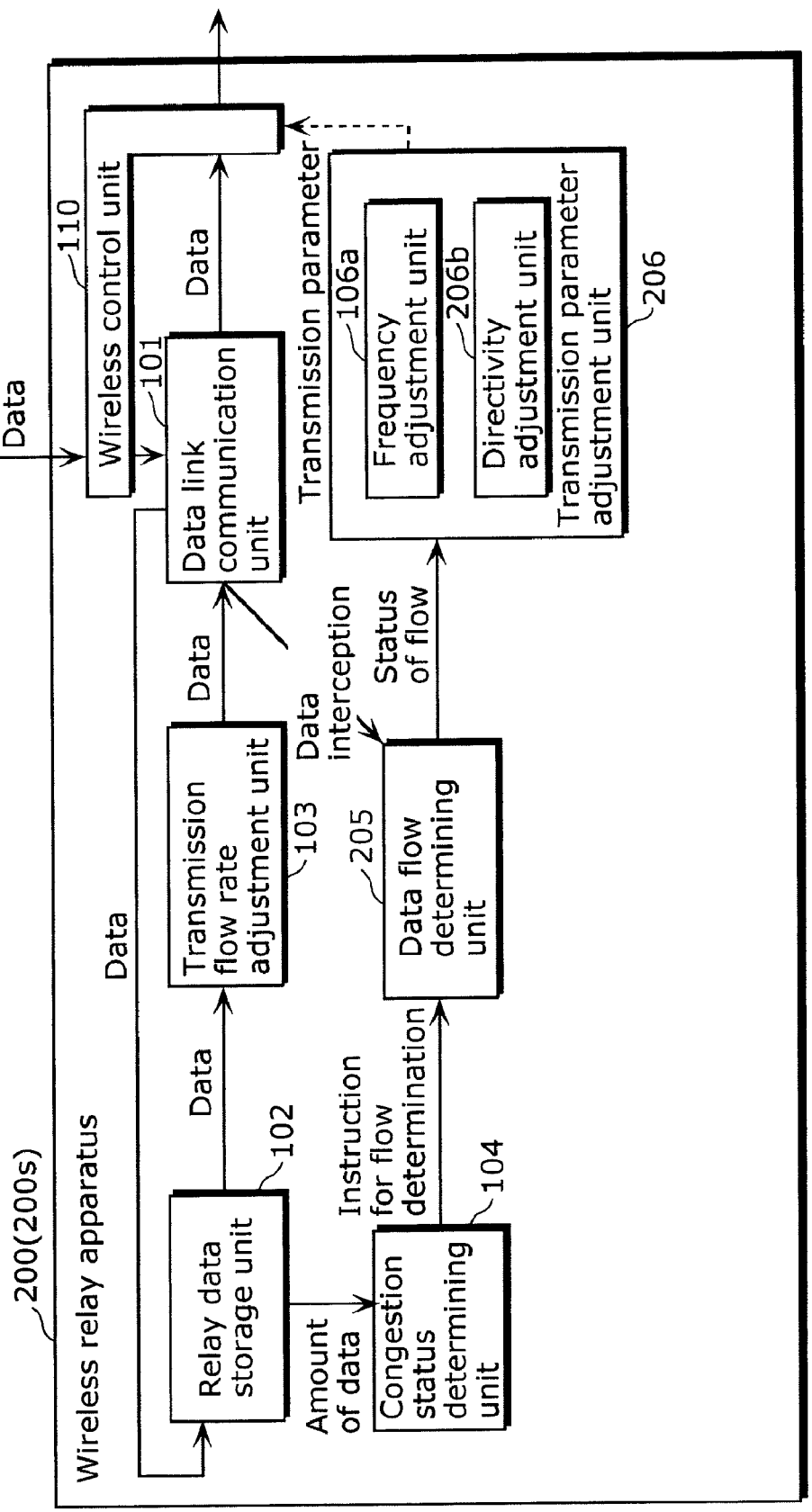
FIG. 10 is a diagram showing the structure of the wireless relay apparatus according to Embodiment 2 of the present invention.

FIG. 10 shows the configuration of the wireless relay apparatus according to Embodiment 2.

The wireless relay apparatus 200 according to Embodiment 2 performs wireless relaying by the protocol stack in the same manner as the wireless relay apparatus 100 according to Embodiment 1. However, the wireless relay apparatus 200 determines flow without collecting the positional information indicating the positions of the own relay apparatus 200s and the other relay apparatuses 200n.

The wireless relay apparatus 200 (the own relay apparatus 200s) includes the data link communication unit 101, the relay data storage unit 102, the transmission flow rate adjustment unit 103, the congestion status determining unit 104, a data flow determining unit 205, a transmission parameter adjustment unit 206, and the wireless control unit 110.

Note that, among the components of the wireless relay apparatus 200 according to the second embodiment, the components to which reference numerals identical to those of the wireless relay apparatus 100 are attached have identical function and configuration of the wireless relay apparatus 100.

As described above, the wireless relay apparatus 200 according to Embodiment 2 does not include the positional information detecting unit 107 and the positional information collecting unit 108 provided in the wireless relay apparatus 100 according to Embodiment 1, and performs the flow determination. This means that the wireless relay apparatus 200 does not identify the positions of the own relay apparatus 200s and the other relay apparatuses 200n. Instead, the data flow determining unit 205 according to the second embodiment analyzes the transmission source and destination of all of the received packets, regardless of whether the packets received by the data link communication unit 101 is transmitted to the own relay apparatus 200s, and performs the flow determination based on the result of analysis.

FIG. 11 is a flowchart showing the operations by the dataflow determining unit 205 according to Embodiment 2.

The data flow determining unit 205 identifies the destination and the transmission source of all of the packets transmitted from the other relay apparatuses 200n within a range where the radio wave arrives and captured by the data link communication unit 101 (step S200).

Furthermore, the data flow determining unit 205 classifies all of the packets according to the destination and the transmission source and analyzes the flow in the traffic to determine the status of the flow (step S202).

Note that, the status of flow in Embodiment 2 includes a flow indicating from which apparatus to which apparatus the data flows, and indicating whether or not the flows intersect each other.

Figure 12A:
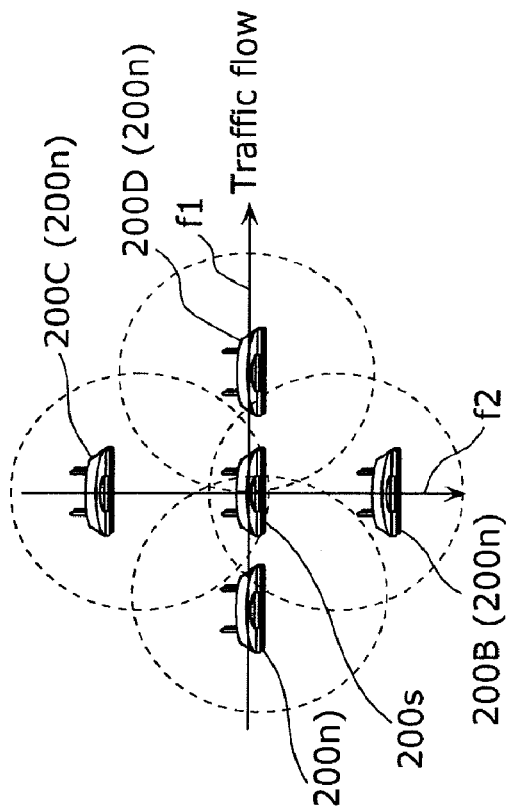
FIG. 12A is an explanatory diagram for explaining a specific example on determining the flow in Embodiment 2 of the present invention.
Figure 12B:
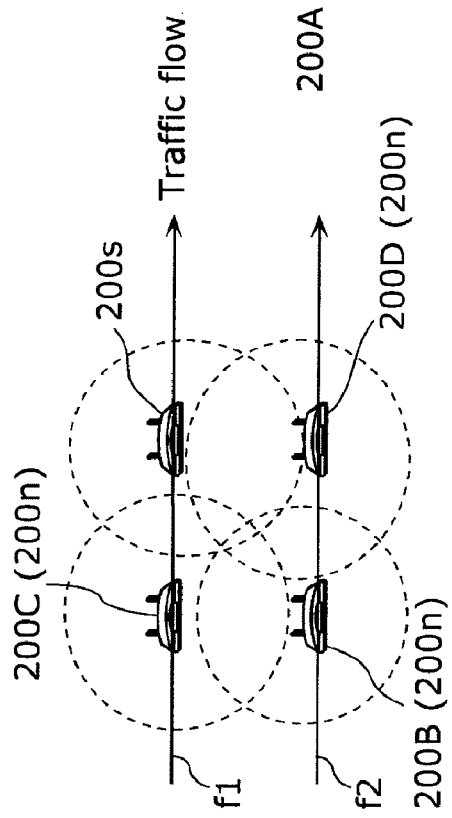
FIG. 12B is an explanatory diagram for explaining a specific example on determining the flow in Embodiment 2 of the present invention.

FIG. 12A and FIG. 12B are explanatory diagrams explaining a specific example of flow determination according to Embodiment 2.

When the congestion occurs, the data flow determining unit 205 in the own relay apparatus 200s analyzes all of the packets captured by the data link communication unit 101. More specifically, the data flow determining unit 205 analyzes the packets in the flow f1 which is related to the apparatus itself, and the packets in the flow f2 which is not related to the apparatus itself, and identify the transmission source and the destination of the packets, as shown in FIG. 12A.

The data flow determining unit 205 determines the status of flow around the own relay apparatus 200s using the identified transmission source and the destination. More specifically, the data flow determining unit 205 identifies the data flow f1 flowing from the other relay apparatus 200c (200n) to the own relay apparatus 200s and the data flow f2 flowing from the other relay apparatus 200B (200n) to the other relay apparatus 200D (200n), and determines that they do not intersect each other.

A specific method for analyzing all of the captured packets includes, for example, a promiscuous mode. That is, the network card of the wireless relay apparatus 200 is operated in the promiscuous mode. The network card is usually set to receive only the packets addressed to the apparatus itself. When the packets addressed to another destination arrives from the channel, the packets is not read and is discarded. The network card set in the promiscuous mode takes over all of the received packets to software in a higher layer regardless of the destination, and this enables analyzing all of the packets flowing in the transmission path.

Furthermore, the data flow determining unit 205 in the own relay apparatus 200s identifies the flow f1 flowing from the other relay apparatus 200A (200n) to the other relay apparatus 200D via the own relay apparatus 200s, and the flow f2 flowing from the other relay apparatus 200C to the other relay apparatus 200B via the own relay apparatus 200s as shown in FIG. 12B, and determines that the flows intersect each other in the own relay apparatus 200s.

Furthermore, in the second embodiment, the status of flow notified by the data flow determining unit 205 does not include the position of each of the wireless relay apparatuses.

Accordingly, the directivity adjustment unit 206 in the transmission parameter adjustment unit 206 determines an appropriate transmission parameter by adjusting the transmission parameter indicating the directivity of the radio wave by trial and error.

As described above, in Embodiment 2, the exchange of the positional information between the wireless relay apparatuses in Embodiment 1 is not necessary. Thus, compared to Embodiment 1, the effect that it is less likely to cause congestion is expected.

In addition, it is possible to suppress the effect of the error on detecting positions, and the effect of the case where the neighboring other relay apparatuses are moving. However, in this embodiment, it is harder to keep track of the accurate positional relationship among the wireless relay apparatuses. This makes it difficult to accurately control the output and direction of the radio wave, and to promptly solve the effect of congestion caused by the interference.

Note that, the wireless relay apparatus according to the present invention has been explained based on Embodiments 1 and 2. However, the present invention is not limited to these Embodiments.

For example, in Embodiments 1 and 2, a case where the flows intersect each other at an angle substantially equal to 90 degrees (that is, the flows are bisecting each other at a right angle) and it is determined that the flows intersect each other. However, the angle of intersection is not limited to 90 degrees, and may be at any angle. Similarly, in Embodiments 1 and 2, a case where the flows are parallel to each other is listed as an example, and it is determined that the flows do not intersect each other. However, the flows may not be in parallel as long as they do not intersect each other.

Furthermore, in Embodiment 1, it is determined that whether or not the flow intersect each other in the own relay apparatus 100s. However, it may be determined whether or not the own relay apparatus 100s and the next hop intersect each other.

Figures 13A, 13B:
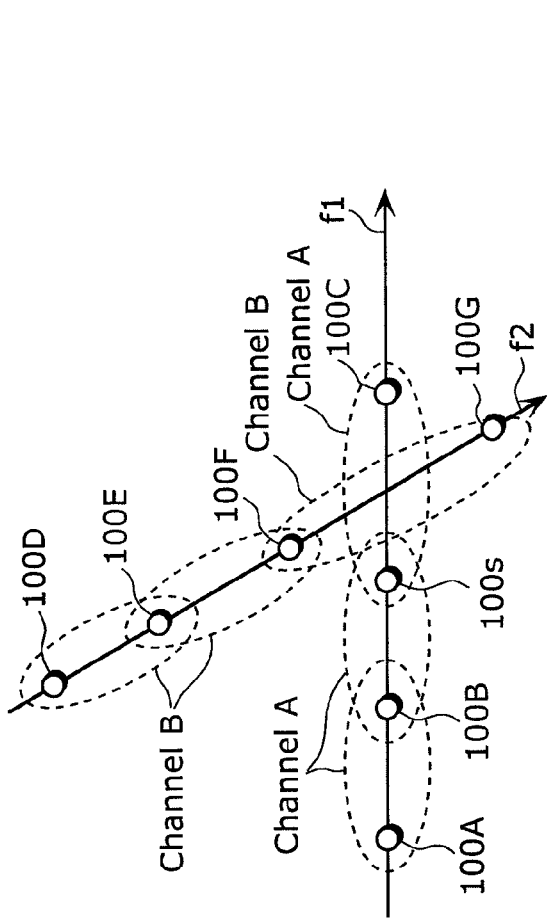
FIG. 13A is an explanatory diagram for explaining a determination example of the intersecting flow and the operation of the own-terminal apparatus based on the determination result.
FIG. 13B is an explanatory diagram for explaining an example of a case where the frequency is adjusted even if the multiple flows do not intersect each other.
Figure 15B:
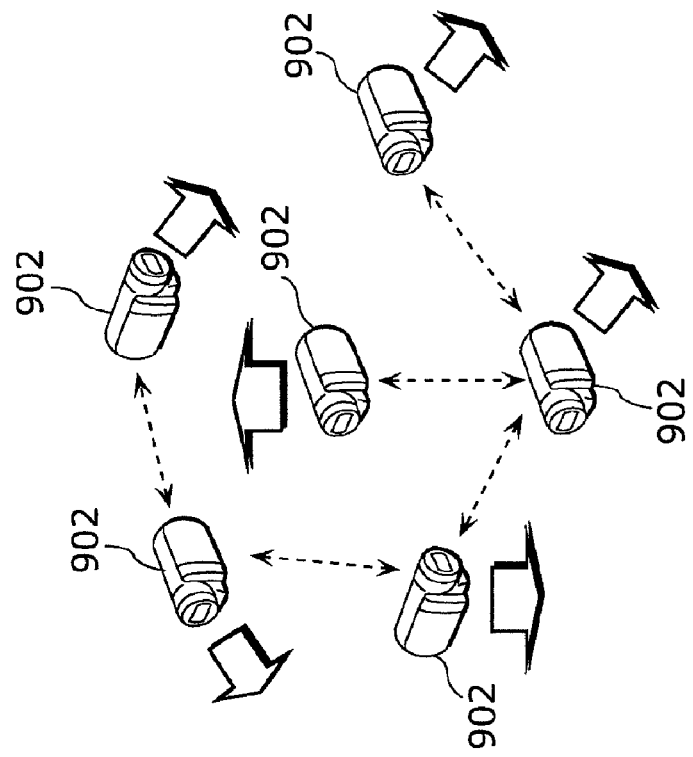
FIG. 15B is a diagram showing another example of the conventional wireless network with a network configuration that can be dynamically modified.
Figure 15A:
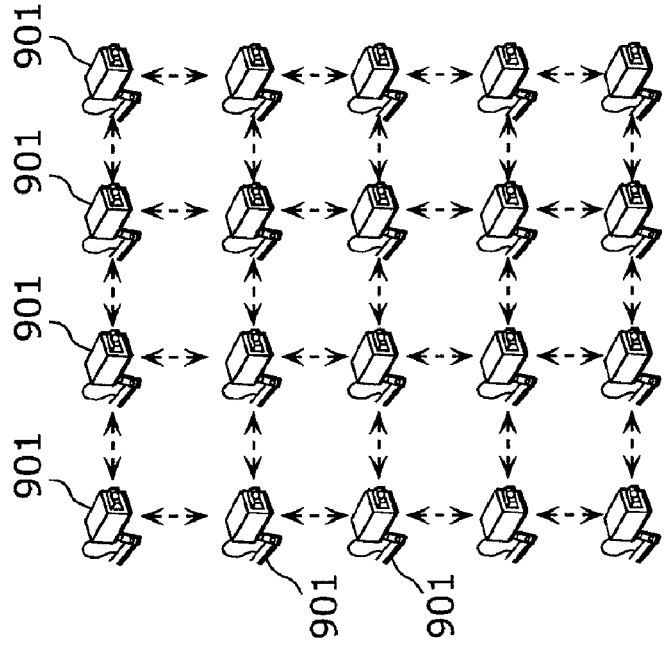
FIG. 15A is a diagram showing an example of the conventional wireless network with a network configuration that can be dynamically modified.
Figure 17B:
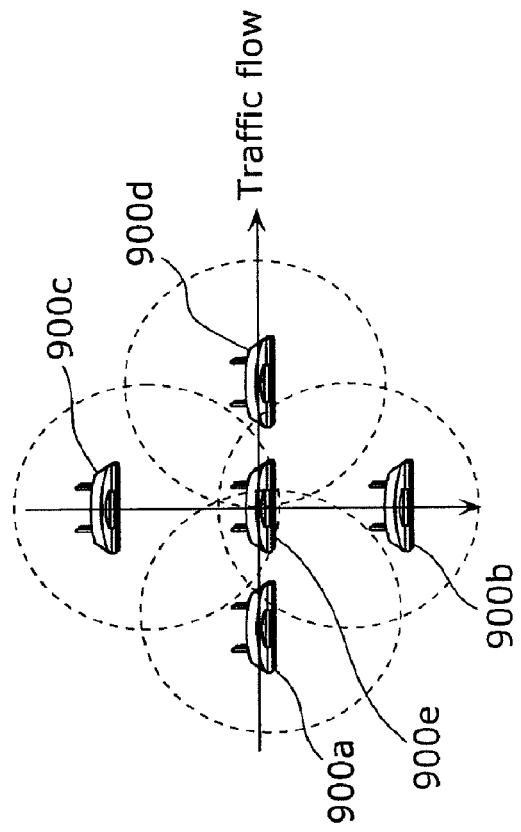
FIG. 17B is an explanatory diagram for explaining the congestion caused by the radio wave interference.
Figure 17A:
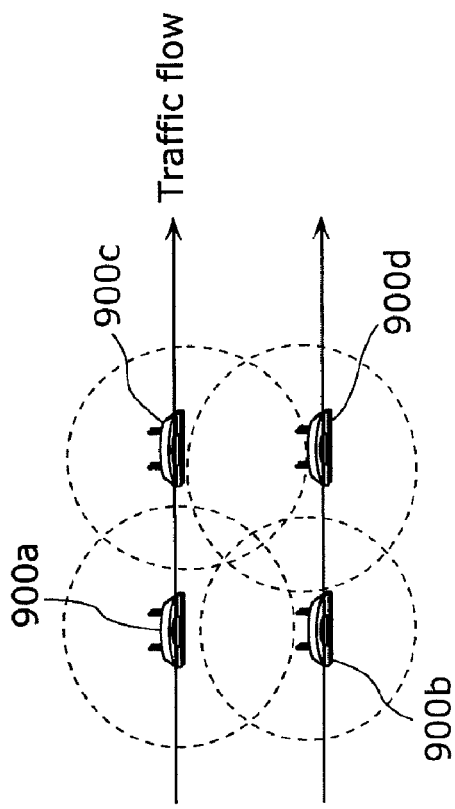
FIG. 17A is an explanatory diagram for explaining the congestion caused by the radio wave interference.

FIG. 13A is an explanatory diagram for describing the operations of the own terminal apparatus 100s based on the determination example of the intersecting flows and the result of determination.

For example, as shown in FIG. 13A, there are the flow f1 in which data flows from the other relay apparatus 100A to the other relay apparatus 100C via the other relay apparatuses 100B and the own relay apparatus 100s and the flow f2 in which data flows from the other relay apparatus 100D to the other relay apparatus 100G via the other relay apparatus 100E and the other relay apparatus 100F.

In this case, as described in Embodiment 1, the own relay apparatus 100s identifies the flows f1 and f2 and determines whether the flows f1 and f2 are intersect each other between the other relay apparatus 100s and the next hop (the other relay apparatus 100C which is a destination according to the flow f1 in the own relay apparatus 100s), based on the flows f1 and f2 and the positions of the other relay apparatuses 100A to 100G. As a result, when the own relay apparatus 100s determines that the flows intersect each other, the own relay apparatus 100s changes the frequency of the radio wave transmitted from the own relay apparatus 100s to the other relay apparatus 100C, such that the frequencies of the flows f1 and f2 are different. For example, when the frequencies of the flows f1 and f2 are set to the channel B, the own relay apparatus 100s changes the frequency of the radio wave transmitted from the own relay apparatus 100s to the other relay apparatus 100C to the channel A. Note that, here, the own relay apparatus 100s may sequentially change, from the other relay apparatus 100B to the other relay apparatus 100A, the frequency used for the flow f1 from the channel B to the channel A. Furthermore, when it is determined that the flows do not intersect each other, the own relay apparatus 100s increases the directivity of the radio wave to be transmitted in the direction towards the other relay apparatus 100C.

Furthermore, in Embodiments 1 and 2, the frequency is adjusted when the flows intersect each other, and the directivity is adjusted when the flows do not intersect each other. However, the frequency may be adjusted even when the flows do not intersect each other.

FIG. 13B is an explanatory diagram for explaining an example of a case where the frequency is adjusted even if the multiple flows do not intersect each other.

For example, as shown in FIG. 13B, there are a flow f3 in which the data flows from the own relay apparatus 100s to the other relay apparatus 100C via the other relay apparatus 100A and the other relay apparatus 100B, and a flow f4 in which the data flows from the other relay apparatus 100D to the other relay apparatus 100H via the other relay apparatus 100E, the other relay apparatus 100F, and the other relay apparatus 100G.

In this case, in the same manner as Embodiment 1, the own relay apparatus 100s identifies the flows f3 and f4, and determines whether the flows f3 and f4 intersect each other between the own relay apparatus 100s and the next hop (the other relay apparatus 100A which is the destination according to the flow f3 in the own relay apparatus 100s). Here, for example, even when the own relay apparatus 100s determines that the flows do not intersect each other, and increases the directivity of the radio wave to be transmitted to the direction towards the other relay apparatus 100A which is the next hop, there are cases where the radio wave does not reach the other relay apparatus 100A due to the long distance to the other relay apparatus 100A, as shown in FIG. 13B. More specifically, simply switching the adjustment of frequency and directivity depending on whether or not the flows intersect each other may cause the adjustment in directivity to fail. Thus, when the own relay apparatus 100s determines that the flows do not intersect each other, the own relay apparatus 100s determines whether or not the distance from the own relay apparatus 100s to the other relay apparatus 100A which is the next hop is equal to or longer than a threshold, and when it is determined that the distance is equal to or more than the threshold, the own relay apparatus 100s changes the frequency of the radio wave to be transmitted and increase the out put of the radio wave, without increasing the directivity. For example, the own relay apparatus 100s changes the frequency from the channel B to the channel A. Here, the own relay apparatus 100s increases the output of the radio wave such that the radio wave to be transmitted (the channel A) reaches the other relay apparatus 100A. On the other hand, when it is determined that the distance is less than the threshold, the own relay apparatus 100s increases the directivity.

With this, it is possible to appropriately suppress the radio wave interference between flows.

Note that, as shown in FIG. 13A, when the distance between the wireless relay apparatuses are relatively short, the adjustment of the directivity does not fail, and switching between the adjustment of frequency and directivity depending on whether or not the flows intersect each other is fully effective.

Furthermore, in the present invention, it is assumed that the positional information is exchanged regularly between the wireless relay apparatuses in order to keep track of the positional relationship with the neighboring wireless relay apparatus. When exchanging the positional information, the directivity of the radio wave is stopped, and positional information is exchanged by multiple addressing. Furthermore, with the present invention, the frequency band which is a limited source is effectively used and the number of cases where multiple frequencies are simultaneously processed are reduced. Accordingly, it is possible to simplify the structure of the wireless relay apparatus and reduce the processing amount.

As described above, the present invention is explained with reference to Embodiments 1 and 2. The present invention is applicable to various uses.

FIG. 14E is a diagram showing the use of the present invention.

For example, the wireless relay apparatus according to the present invention is provided in each of the monitoring cameras Ca included in the monitoring system as shown in FIG. 14A. More specifically, when setting the monitoring cameras with wireless relay function in town, there are cases where the monitoring cameras are closely-provided due to a number of obstacles or need for detailed monitoring.

Accordingly, due to the effect such as the congestion caused by the radio wave interference, the transmission quality between the monitoring cameras is low, and it is necessary to control the frequency and directivity of the wireless relay apparatus provided in many of the monitoring cameras. In response to this need, providing the wireless relay apparatus according to the present invention enables high quality transmission without too much trouble through an automatic search by the monitoring camera itself for the cause of the degradation in the transmission quality and by an automatic adjustment of the frequency and the directivity after the monitoring camera is provided.

Furthermore, the wireless relay apparatus according to the present invention is provided in each of base stations Bs included in the wireless LAN, as shown in FIG. 14B. Similar to the monitoring cameras, when setting a number of base stations in busy streets and in an establishment, setting the wireless relay apparatus according to the present invention in the base station allows the effect of the present invention to be full achieved even in the wireless LAN.

Furthermore, the wireless relay apparatus according to the present invention is provided in each of the mobile movie cameras as shown in FIG. 14C. More specifically, using a movie camera having wireless relaying function allows sharing and recording the video captured at the events such as an athletic festival.

Accordingly, it is possible to capture and record video from various viewpoints. That is, each movie camera can record the whole athletic festival by recording, in the movie camera itself, the video captured at various points.

However, in the events such as the athletic festival, there are many movie cameras. For this reason, the transmission quality between the movie cameras is low due to the effect of congestion caused by the radio wave interference and others.

Thus, it is necessary to control the frequency and directivity according to the transmission status such as the congestion caused by the radio wave interference. Furthermore, since the positions of the movie cameras changes temporally, and the number of movie cameras fluctuates. Accordingly, it is necessary to control the frequency and directivity depending on the transmission status.

In response to the problem, by providing the wireless relay apparatus in the movie camera allows high quality transmission without causing much trouble, even when the positions and the number of the movie cameras change. This is achieved by the movie camera itself searching for the cause of degradation in the transmission quality and automatically adjusts the frequency and directivity.

Furthermore, the wireless relay apparatus according to the present invention may be provided in a mobile phone, instead of the movie camera. Similar effect is expected in this case as well.

Furthermore, the wireless relay apparatus according to the present invention is provided in each of the facsimiles Fa used for emergency communication network at the time of disaster, as shown in FIG. 14D. More specifically, the facsimile in each household having wireless relay function, when the telephone line is disconnected due to disasters and others can automatically reconfigure the network in coordination.

However, as described above, in the inner-city area, there are many facsimiles concentrated in one area. In this case, the transmission quality between the facsimiles is low due to the effect of congestion caused by the radio wave interference and others. Thus, it is necessary to control the frequency and directivity according to the status of transmission status.

Thus, incorporating the wireless relay apparatus according to the present invention in a facsimile achieves high-quality transmission without causing trouble, since each of the facsimiles automatically adjusts the frequency and directivity. Furthermore, instead of such a facsimile, a wireless relay apparatus according to the present invention may be provided in a mobile phone. Similar effect is expected in this case as well.

Furthermore, the wireless relay apparatus according to the present invention is incorporated in the on-vehicle image display apparatuses used for a transportation safety system as shown in FIG. 14E. This transportation safety system prevents an accident and a subsequent crash between the vehicles that occur when a child jumps to the street by notifying a vehicle near the intersection of the status of child staying around the intersection and jumping out to the intersection, and by notifying the following vehicle of the child using the vehicle-to-vehicle communication. This transportation safety system includes the mobile phone Ke which detects its own position and transmits the positional information indicated by the position, an infra camera Ic which is set at the intersection and captures the status around the intersection, and the on-vehicle image display apparatuses.

The mobile phone Ke is carried by the child to detect the status when the child jumps out to the street. The mobile phone Ke regularly communicates with the infra camera Ic at the intersection, and transmits the positional information indicating the position of the child to the infra camera Ic. The infra camera Ic transmits a warning and video to the on-vehicle image display apparatus on a vehicle approaching the intersection, when the position of the child significantly changes or when the child enters the predetermined dangerous area, despite the red signal.

Furthermore, the on-vehicle image display apparatus that received the warning and video transmits the warning and video to the on-vehicle image display apparatus on the subsequent vehicle. More specifically, the on-vehicle image display apparatus transmits the warning and video using the vehicle-to-vehicle communication.

Furthermore, the on-vehicle image display apparatus that received the warning and video displays the image and notifies the driver of the danger. This achieves safety assistance.

However, in the inner-city area, there are many vehicles concentrated in one area. In this case, the transmission quality between the on-vehicle image display apparatuses is low due to the effect of congestion caused by the radio wave interference and others.

Accordingly, it is necessary to control the frequency and directivity according to the transmission status such as the congestion caused by the radio wave interference.

Furthermore, it is necessary to control the frequency and directivity according to the transmission status each time the position of the vehicle, the positional relationship of the vehicles, and the number of vehicles changes.

Thus, by incorporating the wireless relay apparatus according to the present invention in the on-vehicle image display apparatus enables high-quality transmission without trouble. This is achieved through a search by the on-vehicle image display apparatus itself for the cause of the degradation in the transmission quality and through automatic adjustment of the frequency and directivity, even when the positions and the number of the on-vehicle image display apparatuses change.

Furthermore, the wireless relay apparatus according to the present invention is not only applicable to the on-vehicle image display apparatus that performs safety assistance, but also to an on-vehicle image display apparatus that displays the start of traffic congestion captured by the on-vehicle camera in the vehicle at the start of traffic congestion and transmits the video to the subsequent vehicles, and to an on-vehicle image display apparatus that shares and displays the respective video contents between vehicles.

Furthermore, the wireless relay apparatus and the wireless relay method according to the present invention is effective for achieving high-quality data transmission such as video, audio and text using the ad-hoc network. For example, the wireless relay apparatus and wireless relay method are applicable to in-house monitoring, down monitoring, and the Intelligent Transport Systems (ITS).

Furthermore, the present invention is applicable to, not only the video, audio, and text, but also to the apparatus that relays various data including still images and music, and to a network.

Furthermore, in Embodiments 1 and 2, the wireless relay apparatus (own relay apparatus) performs relay control between the other wireless relay apparatuses (other relay apparatus). However, the relay control may be performed between the other wireless relay apparatus, but between the receiving terminal and the transmission terminal. That is, the apparatus which is subject to the relay control by the wireless relay apparatus according to the present invention is not limited to the other wireless relay apparatus, but may also be the receiving terminal and the transmission terminal.

INDUSTRIAL APPLICABILITY

The wireless relay apparatus and the wireless relay method according to the present invention is applicable to the wireless relay apparatus and the wireless relay method included in the network having a network configuration that can be dynamically modified.

REFERENCE SIGNS LIST

100 Wireless relay apparatus
101 Data link communication unit
102 Relay data storage unit
103 Transmission flow rate adjustment unit
104 Congestion status determining unit
105 Data flow determining unit
106 Transmission parameter adjustment unit
106a Frequency adjustment unit
106b Directivity adjustment unit
107 Positional information detecting unit
108 Positional information collecting unit
109 Routing unit
110 Wireless control unit

The invention claimed is:

1. A wireless relay apparatus for relaying data to be transmitted and received between at least two communication apparatuses among a plurality of communication apparatuses that communicate with each other wirelessly, said wireless relay apparatus comprising:
 a communication unit configured to transmit and receive data wirelessly;
 a data flow determining unit configured to determine, when there is a communication failure in said wireless relay apparatus caused by a radio wave, whether or not flows of data intersect each other in said wireless relay apparatus; and
 an adjustment unit configured to, according to a result of the determination of said data flow determining unit, adjust a directivity of the radio wave, as a transmission parameter of a plurality of transmission parameters of radio used by at least one of said communication unit and the plurality of communication apparatuses,
 wherein, when said data flow determining unit determines that the flows of data intersect each other, said adjustment unit adjusts, as a transmission parameter of the plurality of transmission parameters, a frequency in said communication unit and a communication apparatus, of the plurality of communication apparatuses, for one of the intersecting flows of data, such that the adjusted frequency for the one of the intersecting flows of data and a frequency for another of the intersecting flows of data are different.

2. The wireless relay apparatus according to claim 1, further comprising a communication failure determining unit configured to determine whether or not there is a communication failure caused by a radio wave interference in said wireless relay apparatus,
 wherein, when said communication failure determining unit determines that there is the communication failure, said data flow determining unit determines whether or not the flows of data intersect each other in said wireless relay apparatus, by identifying a flow of data transmitted to and received from said communication unit.

3. A wireless relay apparatus for relaying data to be transmitted and received between at least two communication apparatuses among a plurality of communication apparatuses that communicate with each other wirelessly, said wireless relay apparatus comprising:
 a communication unit configured to transmit and receive data wirelessly;
 a data flow determining unit configured to determine, when there is a communication failure in said wireless relay apparatus caused by a radio wave, whether or not flows of data intersect each other in said wireless relay apparatus;
 an adjustment unit configured to, according to a result of the determination of said data flow determining unit, adjust a directivity of the radio wave, as a transmission parameter of a plurality of transmission parameters of radio used by at least one of said communication unit and the plurality of communication apparatuses; and a communication failure determining unit configured to determine whether or not there is a communication failure caused by a radio wave interference in said wireless relay apparatus, wherein, when said communication failure determining unit determines that there is the communication failure, said data flow determining unit determines whether or not the flows of data intersect each other in said wireless relay apparatus, by identifying a flow of data transmitted to and received from said communication unit, and wherein, when said data flow determining unit determines that the flows of data do not intersect each other, said adjustment unit increases the directivity of the radio wave in said communication unit, as a transmission parameter of the plurality of transmission parameters, such that a direction of the radio wave which carries the data transmitted to and received from said communication unit is restricted to a direction along the identified flow of the data.

4. The wireless relay apparatus according to claim 3, wherein said adjustment unit increases the directivity of the radio wave in said communication unit, such that a direction of the radio wave that can be received by said communication unit is restricted to a communication apparatus, of the plurality of communication apparatuses, which is a transmission source of the identified flow of the data.

5. A wireless relay apparatus for relaying data to be transmitted and received between at least two communication apparatuses among a plurality of communication apparatuses that communicate with each other wirelessly, said wireless relay apparatus comprising:

a communication unit configured to transmit and receive data wirelessly; a data flow determining unit configured to determine, when there is a communication failure in said wireless relay apparatus caused by a radio wave, whether or not flows of data intersect each other in said wireless relay apparatus;

an adjustment unit configured to, according to a result of the determination of said data flow determining unit, adjust a directivity of the radio wave, as a transmission parameter of a plurality of transmission parameters of radio used by at least one of said communication unit and the plurality of communication apparatuses; and a communication failure determining unit configured to determine whether or not there is a communication failure caused by a radio wave interference in said wireless relay apparatus, wherein, when said communication failure determining unit determines that there is the communication failure, said data flow determining unit determines whether or not the flows of data intersect each other in said wireless relay apparatus, by identifying a flow of data transmitted to and received from said communication unit, and wherein, when said data flow determining unit determines that the flows of data do not intersect each other, said adjustment unit increases the directivity of a radio wave outputted from a communication apparatus, of the plurality of communication apparatuses, located around said wireless relay apparatus, such that a direction of the radio wave outputted from the communication apparatus which is a transmission source located around said wireless relay apparatus and which is other than a communication apparatus on the identified flow of the data, is restricted to another communication apparatus, of the plurality of communication apparatuses, which is a destination.

6. The wireless relay apparatus according to claim 3, further comprising a position obtaining unit configured to obtain a position of a communication apparatus, of the plurality of communication apparatuses, on the flow of the data identified by said data flow determining unit, wherein said adjustment unit increases the directivity of the radio wave in said communication unit, such that the direction of the radio wave is restricted to a direction connecting the position of the communication apparatus obtained by said position obtaining unit and a position of said wireless relay apparatus.

7. The wireless relay apparatus according to claim 2, wherein said data flow determining unit identifies the flow of the data based on information indicating a transmission source and a destination of the data included in the data received by said communication unit.

8. The wireless relay apparatus according to claim 2, further comprising a routing unit configured to create route information indicating a route for relaying the data, wherein said data flow determining unit identifies the flow of the data by referring to the route information.

9. The wireless relay apparatus according to claim 2, wherein said communication unit receives data that is not relayed by said wireless relay apparatus, and wherein said data flow determining unit identifies the flow of the data transmitted to and received from, between the at least two communication apparatuses except said wireless relay apparatus, based on information included in the data that is not relayed and received by said communication unit, the information indicating a transmission source and a destination of the data.

10. A wireless relay method for relaying, by a relay apparatus, data to be transmitted and received between at least two communication apparatuses among a plurality of communication apparatuses that communicate with each other wirelessly, said wireless relay method comprising:

transmitting and receiving, via a communication unit, the data to and from the relay apparatus wirelessly;

determining, when there is a communication failure in the relay apparatus caused by a radio wave, whether or not flows of data intersect each other in the relay apparatus; and adjusting, according to a result of the determination of said determining of whether or not the flows of data intersect each other, a directivity of the radio wave, as a transmission parameter of a plurality of transmission parameters of radio used by at least one of the plurality of communication apparatuses, wherein, when said determining determines that the flows of data intersect each other, said adjusting adjusts, as a transmission parameter of the plurality of transmission parameters, a frequency in the communication unit and a communication apparatus, of the plurality of communication apparatuses, for one of the intersecting flows of data, such that the adjusted frequency for the one of the intersecting flows of data and a frequency for another of the intersecting flows of data are different.

11. A non-transitory computer-readable recording medium having a program recorded thereon, the program for relaying, by a relay apparatus, data to be transmitted and received between at least two communication apparatuses among a plurality of communication apparatuses that communicate with each other wirelessly, the program causing a computer to execute a method comprising:

transmitting and receiving, via a communication unit, the data to and from the relay apparatus wirelessly;

determining, when there is a communication failure in the relay apparatus caused by a radio wave, whether or not flows of data intersect each other in the relay apparatus; and adjusting, according to a result of the determination of said determining of whether or not the flows of data intersect each other, a directivity of the radio wave, as a transmission parameter of a plurality of transmission parameters of radio used by at least one of the plurality of communication apparatuses, wherein, when said determining determines that the flows of data intersect each other, said adjusting adjusts, as a transmission parameter of the plurality of transmission parameters, a frequency in the communication unit and a communication apparatus, of the plurality of communication apparatuses, for one of the intersecting flows of data, such that the adjusted frequency for the one of the intersecting flows of data and a frequency for another of the intersecting flows of data are different.

12. A wireless relay method for relaying, by a relay apparatus, data to be transmitted and received between at least two communication apparatuses among a plurality of communication apparatuses that communicate with each other wirelessly, said wireless relay method comprising:

transmitting and receiving, via a communication unit, the data to and from the relay apparatus wirelessly;

determining, when there is a communication failure in the relay apparatus caused by a radio wave, whether or not flows of data intersect each other in the relay apparatus;

adjusting, according to a result of the determination of said determining of whether or not the flows of data intersect each other, a directivity of the radio wave, as a transmission parameter of a plurality of transmission parameters of radio used by at least one of the plurality of communication apparatuses; and determining whether or not there is a communication failure caused by a radio wave interference in the relay apparatus, wherein, when said determining of whether or not there is the communication failure determines that there is the communication failure, said determining of whether or not the flows of data intersect each other determines whether or not the flows of data intersect each other in the relay apparatus, by identifying a flow of data transmitted to and received from the communication unit, and wherein, when said determining of whether or not the flows of data intersect each other determines that the flows of data do not intersect each other, said adjusting increases the directivity of the radio wave in the communication unit, as a transmission parameter of the plurality of transmission parameters, such that a direction of the radio wave which carries the data transmitted to and received from the communication unit is restricted to a direction along the identified flow of the data.

13. A wireless relay method for relaying, by a relay apparatus, data to be transmitted and received between at least two communication apparatuses among a plurality of communication apparatuses that communicate with each other wirelessly, said wireless relay method comprising:

transmitting and receiving, via a communication unit, the data to and from the relay apparatus wirelessly;

determining, when there is a communication failure in the relay apparatus caused by a radio wave, whether or not flows of data intersect each other in the relay apparatus;

adjusting, according to a result of the determination of said determining of whether or not the flows of data intersect each other, a directivity of the radio wave, as a transmission parameter of a plurality of transmission parameters of radio used by at least one of the plurality of communication apparatuses; and determining whether or not there is a communication failure caused by a radio wave interference in the relay apparatus, wherein, when said determining of whether or not there is the communication failure determines that there is the communication failure, said determining of whether or not the flows of data intersect each other determines whether or not the flows of data intersect each other in the relay apparatus, by identifying a flow of data transmitted to and received from the communication unit, and wherein, when said determining of whether or not the flows of data intersect each other determines that the flows of data do not intersect each other, said adjusting increases the directivity of a radio wave outputted from a communication apparatus, of the plurality of communication apparatuses, located around the relay apparatus, such that a direction of the radio wave outputted from the communication apparatus which is a transmission source located around the relay apparatus and which is other than a communication apparatus on the identified flow of the data, is restricted to another communication apparatus, of the plurality of communication apparatuses, which is a destination.

14. A non-transitory computer-readable recording medium having a program recorded thereon, the program for relaying, by a relay apparatus, data to be transmitted and received between at least two communication apparatuses among a plurality of communication apparatuses that communicate with each other wirelessly, the program causing a computer to execute a method comprising:

transmitting and receiving, via a communication unit, the data to and from the relay apparatus wirelessly;

determining, when there is a communication failure in the relay apparatus caused by a radio wave, whether or not flows of data intersect each other in the relay apparatus;

adjusting, according to a result of the determination of said determining of whether or not the flows of data intersect each other, a directivity of the radio wave, as a transmission parameter of a plurality of transmission parameters of radio used by at least one of the plurality of communication apparatuses; and determining whether or not there is a communication failure caused by a radio wave interference in the relay apparatus, wherein, when said determining of whether or not there is the communication failure determines that there is the communication failure, said determining of whether or not the flows of data intersect each other determines whether or not the flows of data intersect each other in the relay apparatus, by identifying a flow of data transmitted to and received from the communication unit, and wherein, when said determining of whether or not the flows of data intersect each other determines that the flows of data do not intersect each other, said adjusting increases the directivity of the radio wave in the communication unit, as a transmission parameter of the plurality of transmission parameters, such that a direction of the radio wave which carries the data transmitted to and received from the communication unit is restricted to a direction along the identified flow of the data.

15. A non-transitory computer-readable recording medium having a program recorded thereon, the program for relaying, by a relay apparatus, data to be transmitted and received between at least two communication apparatuses among a plurality of communication apparatuses that communicate with each other wirelessly, the program causing a computer to execute a method comprising:

- transmitting and receiving, via a communication unit, the data to and from the relay apparatus wirelessly;
- determining, when there is a communication failure in the relay apparatus caused by a radio wave, whether or not flows of data intersect each other in the relay apparatus;
- adjusting, according to a result of the determination of said determining of whether or not the flows of data intersect each other, a directivity of the radio wave, as a transmission parameter of a plurality of transmission parameters of radio used by at least one of the plurality of communication apparatuses; and
- determining whether or not there is a communication failure caused by a radio wave interference in the relay apparatus, wherein, when said determining of whether or not there is the communication failure determines that there is the communication failure, said determining of whether or not the flows of data intersect each other determines whether or not the flows of data intersect each other in the relay apparatus, by identifying a flow of data transmitted to and received from the communication unit, and wherein, when said determining of whether or not the flows of data intersect each other determines that the flows of data do not intersect each other, said adjusting increases the directivity of a radio wave outputted from a communication apparatus, of the plurality of communication apparatuses, located around the relay apparatus, such that a direction of the radio wave outputted from the communication apparatus which is a transmission source located around the relay apparatus and which is other than a communication apparatus on the identified flow of the data, is restricted to another communication apparatus, of the plurality of communication apparatuses, which is a destination.

* * * * *